(12) United States Patent
Saito

(10) Patent No.: US 11,650,772 B2
(45) Date of Patent: May 16, 2023

(54) SERVER SYSTEM DETERMINING FILE THAT NEEDS TO BE PRINTED, AND CONTROL METHOD OF SERVER SYSTEM

(71) Applicant: CANON KABUSHIKI KAISHA, Tokyo (JP)

(72) Inventor: Kazuyuki Saito, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/119,605

(22) Filed: Dec. 11, 2020

(65) Prior Publication Data

US 2021/0191672 A1    Jun. 24, 2021

(30) Foreign Application Priority Data

Dec. 18, 2019   (JP) .............................. JP2019-228216

(51) Int. Cl.
| | |
|---|---|
| *G06F 15/16* | (2006.01) |
| *G06F 3/12* | (2006.01) |
| *H04L 67/06* | (2022.01) |
| *G06F 9/54* | (2006.01) |

(52) U.S. Cl.
CPC .......... *G06F 3/1224* (2013.01); *G06F 3/1288* (2013.01); *G06F 9/54* (2013.01); *H04L 67/06* (2013.01)

(58) Field of Classification Search
CPC ........ G06F 3/1224; G06F 3/1288; G06F 9/54; H04L 67/06

USPC .................................. 709/201.203, 201, 203
See application file for complete search history.

(56) References Cited

U.S. PATENT DOCUMENTS

| | | | | |
|---|---|---|---|---|
| 2004/0012802 | A1* | 1/2004 | Allen | G06F 3/1212 358/1.15 |
| 2018/0227251 | A1* | 8/2018 | Takishima | G06F 3/1225 |
| 2019/0297032 | A1* | 9/2019 | Zhang | H04L 51/02 |
| 2020/0099637 | A1* | 3/2020 | Kurokawa | H04L 51/04 |
| 2020/0304437 | A1* | 9/2020 | Sasamae | H04L 51/02 |
| 2020/0304439 | A1* | 9/2020 | Matsumoto | H04L 51/04 |

FOREIGN PATENT DOCUMENTS

| | | |
|---|---|---|
| JP | 2019144697 A | 8/2019 |
| JP | 2019164653 A | 9/2019 |

* cited by examiner

*Primary Examiner* — Duyen M Doan
(74) *Attorney, Agent, or Firm* — Canon U.S.A., Inc. IP Division

(57) ABSTRACT

Which file to be printed is determined in a case where a print instruction is given from a user in a conversation service. A server system that provides a conversation service includes a determination unit configured to determine that a print instruction has been given from a user in the conversation service, and a posting unit configured to, on a basis of the determination unit determining that the print instruction has been given, post on the conversation service a name of a file as a print target candidate, the file being uploaded to the conversation service most recently before the determination unit determines that the print instruction has been given.

14 Claims, 21 Drawing Sheets

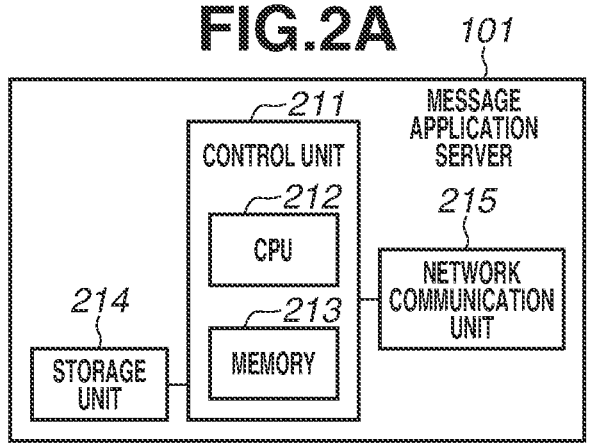
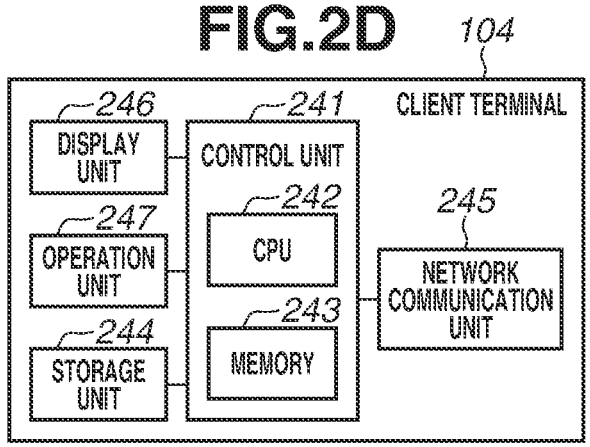
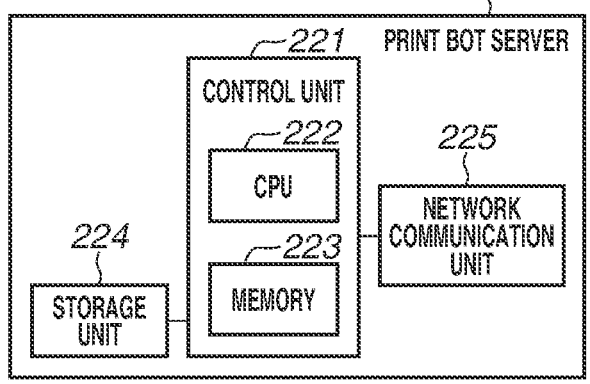
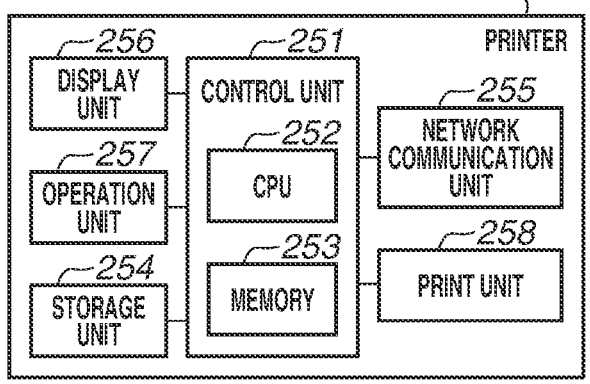
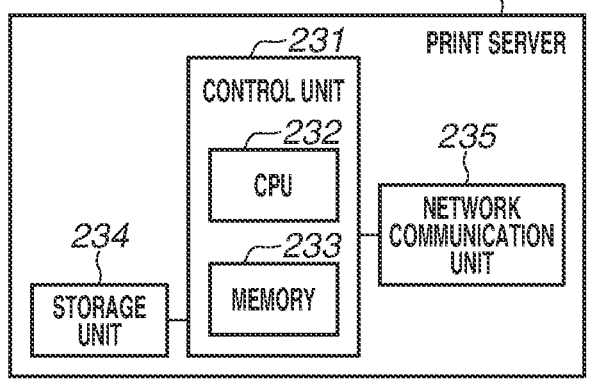

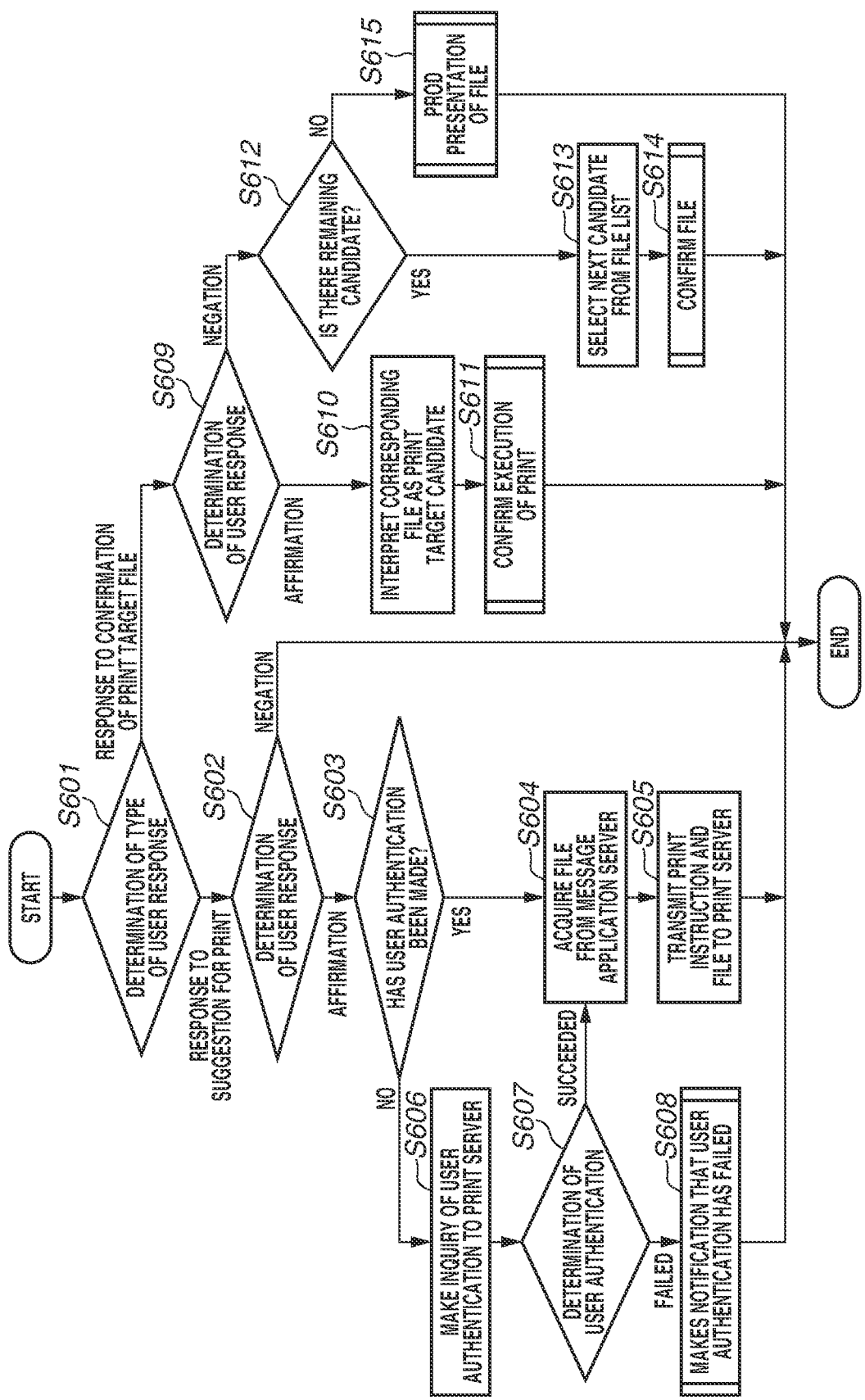

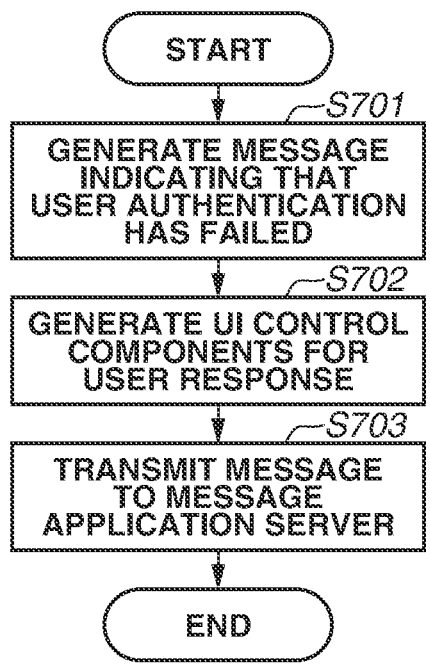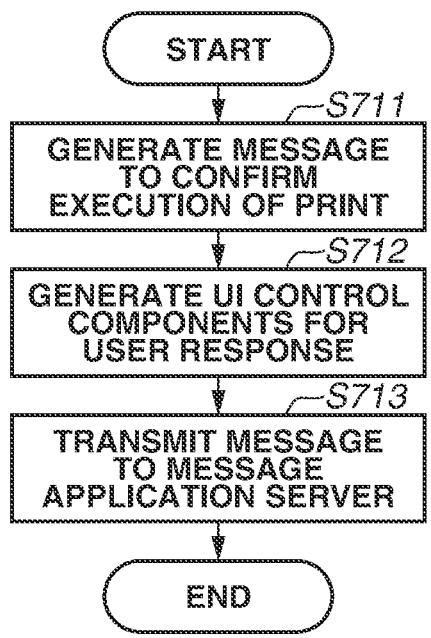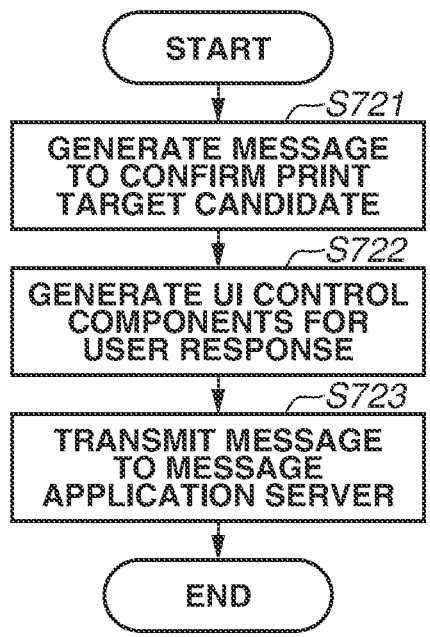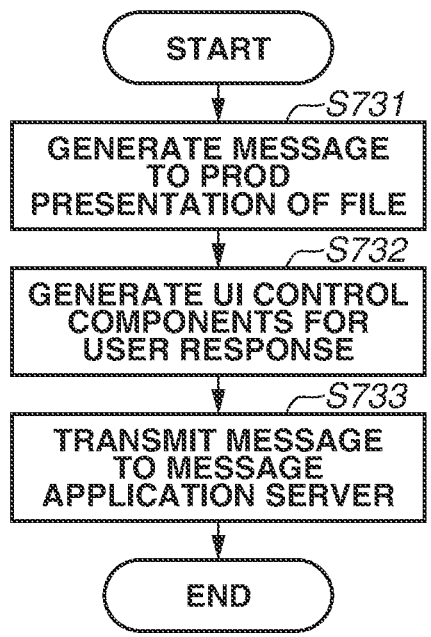

FIG.21A

```
{
    "event_type": "message",  ~2101
    "user": "User A",
    "text": "Can anyone give me the document?",
    "time": "20191028143051",
    "room": "Project-A",
    "room_type": "group"
}
```

FIG.21B

```
{
    "event_type": "mention",  ~2102
    "user": "User C",
    "text": "@Print_Bot, please print.",
    "time": "20191028144024",
    "room": "Project-A",
    "room_type": "group"
}
```

SERVER SYSTEM DETERMINING FILE THAT NEEDS TO BE PRINTED, AND CONTROL METHOD OF SERVER SYSTEM

BACKGROUND

Field

The present disclosure relates to determination of a file that needs to be printed out of files uploaded to a conversation service.

Description of the Related Art

A messaging application for a so-called business chat to exchange messages between a plurality of user terminals via a network has grown in use. Recent years have seen an increase in service in such a messaging application using a so-called bot that automatically returns a message according to a content of a message transmitted by a user on the messaging application. Meanwhile, a printing machine also has had a network communication function along with the widespread use of a cloud service, and a cloud print service, with which the user gives a print instruction from a terminal via the network, has been provided.

Coordination between the cloud print service and bot service described above allows the user to give the print instruction to the printing machine from the messaging application on the terminal in a form of interaction with the bot service. In performing print on the messaging application via a print bot, a suggestion for print by the print bot to the user is convenient.

However, intervention of the print bot in conversation between users may make a print target file indistinct, for example, in a case where the conversation between the users has continued.

Japanese Patent Application Laid-Open No. 2019-164653 discusses a method of identifying a print file by attaching a file desired to be printed to a message received by a chat bot. Japanese Patent Application Laid-Open No. 2019-144697 discusses a method of reprinting a print target file printed in the past.

SUMMARY

According to an aspect of the present disclosure, a server system that provides a conversation service includes a determination unit configured to determine that a print instruction has been given from a user in the conversation service, and a posting unit configured to, on a basis of the determination unit determining that the print instruction has been given, post on the conversation service a name of a file as a print target candidate, the file being uploaded to the conversation service most recently before the determination unit determines that the print instruction has been given.

Further features of the present disclosure will become apparent from the following description of exemplary embodiments with reference to the attached drawings.

BRIEF DESCRIPTION OF THE DRAWINGS

FIGS. 2A to 2E are diagrams illustrating respective hardware configurations of a client terminal, a printer, and various servers.

FIG. 6 is a flowchart illustrating an example of processing of the bot service according to the first exemplary embodiment.

FIGS. 7A to 7D are flowcharts each illustrating an example of processing of the bot service according to the first exemplary embodiment.

FIGS. 21A and 21B are diagrams each illustrating an example of event metadata information.

DESCRIPTION OF THE EMBODIMENTS

Exemplary embodiments to implement the present disclosure will be described below with reference to the accompanying drawings.

A server in the following description may be configured as a single server or composed of a plurality of servers. While an expression of a server system is also used in the present specification, the server system may be similarly composed of a single server or a plurality of servers.

Figure 1:
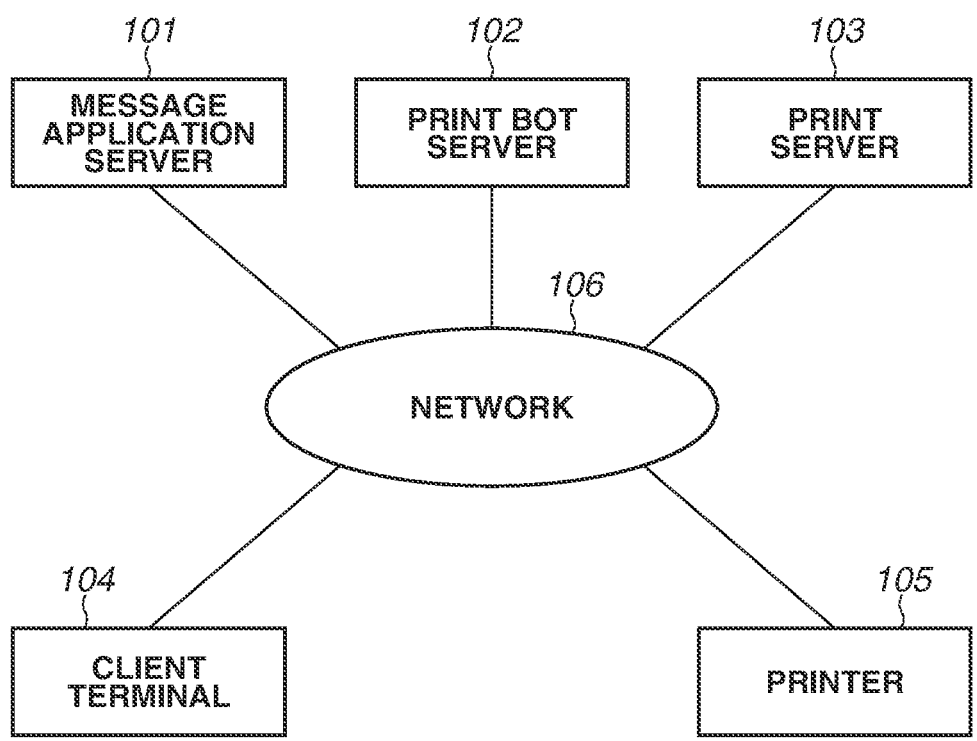
FIG. 1 is a diagram illustrating a system configuration.

FIG. 1 is a diagram illustrating a configuration of a print bot system according to a first exemplary embodiment.

A message application server 101, a print bot server 102, a print server 103, a client terminal 104, a printer 105 are connected to one another via a network 106. While FIG. 1 illustrates one client terminal 104 and one printer 105, there are typically a plurality of client terminals 104 and a plurality of printers 105 in practice. A messaging application may also be referred to as a conversation service. Each server may be configured such that loads are distributed to a plurality of servers. Conversely, each server may be configured such that one physical server virtually plays a role of the plurality of servers within the server. Each server may be a cloud server placed on cloud. The network 106 is assumed to be a wide area network (WAN) such as the Internet, but may be a closed environment such as a corporate local area network (LAN). The client terminal 104 indicates, for example, a personal computer (PC), a tablet, or a smartphone, and is a terminal directly operated by a user. Freely-selected application software is executable on the client terminal 104. The printer 105 is a device that actually performs print on physical paper, and converts print data received via the network 106 to image data to perform print. The message application server 101 provides a messaging service such as a chat to the client terminal 104. The print bot server 102 is registered as a virtual user in the messaging service provided by the message application server 101, and transmits/receives a message as a normal user does. The print server 103 plays a role in accepting a print instruction and document data from the outside, converting the document data to print data, and thereafter transmitting the print data to the predetermined printer 105 to give a print instruction to the predetermined printer 105. In a case where the print server 103 is placed in a cloud environment, the print server 103 may be referred to as a cloud print server. A system of determining timing to cause the printer 105 to perform print may be a push-type system that does not require a user's operation on the printer 105 or a pull-type system of starting print after a user's operation to start print being performed on the printer 105.

Subsequently, a description will be given of a hardware configuration of each device in the system according to the present exemplary embodiment with reference to FIGS. 2A to 2E.

FIG. 2A is a block diagram illustrating a hardware configuration of the message application server 101. The message application server 101 includes a storage unit 214, a control unit 211, and a network communication unit 215. The storage unit 214 indicates a nonvolatile storage device such as a hard disk or a solid state drive (SSD), and can save and rewrite digital data.

The control unit 211 is composed of a central processing unit (CPU) 212 and a memory 213, and controls operations of the whole of the message application server 101. The CPU 212 develops a program stored in the storage unit 214 to the memory 213 and executes the program. The memory 213 is a main memory of the CPU 212, and is used as a work area and a temporary storage area to load various kinds of programs.

The network communication unit 215 is a device to communicate with the external network 106, and inputs/outputs digital data from/to an external server, a client terminal, or the like via the network 106.

FIG. 2B is a block diagram illustrating a hardware configuration of the print bot server 102. The print bot server 102 includes a storage unit 224, a control unit 221, and a network communication unit 225. A description of each unit is equivalent to that of the message application server 101 and thus will be omitted.

FIG. 2C is a block diagram illustrating a hardware configuration of the print server 103. The print server 103 includes a storage unit 234, a control unit 231, and a network communication unit 235. Similarly, a description of each unit will be omitted.

FIG. 2D is a block diagram illustrating a hardware configuration of the client terminal 104. The client terminal 104 includes a display unit 246, an operation unit 247, a storage unit 244, a control unit 241, and a network communication unit 245. The display unit 246 is a device, such as a liquid crystal display, to display visual information in real time to the user. The operation unit 247 is a device to accept an input from the user from a keyboard, a mouse, or the like. A device having functions of both the display unit 246 and the operation unit 247, such as a touch panel, may be used. A description of each of the storage unit 244, the control unit 241, and the network communication unit 245 is equivalent to that of the message application server 101 and thus will be omitted.

FIG. 2E is a block diagram illustrating a hardware configuration of the printer 105. The printer 105 includes a display unit 256, an operation unit 257, a storage unit 254, a control unit 251, a network communication unit 255, and a print unit 258. The display unit 256 is a device that is attached to the printer 105, such as a touch panel and a light emitting diode (LED), to display information in real time to the user. The operation unit 257 is a device to accept an input from the user and may include hardware keys such as a numeric keypad in addition to the touch panel. A description of each of the storage unit 254 and the control unit 251 is equivalent to that of the message application server 101 and thus will be omitted. The network communication unit 255 is a device to communicate with the external network 106, and mainly plays a role of, for example, receiving print data, and transmitting the state of the printer 105 such as an error to an external server or the like. The print unit 258 is a device that performs a sequence of operations of feeding, print, and discharge of paper prepared in a cassette or a tray to perform print processing. A print method is not specifically limited to an electrophotographic method, an inkjet method, or the like. A duplex print unit that is used at the time of discharge and a finishing device that performs stapling processing, punching processing or the like are also included in the print unit 258. While in the present exemplary embodiment, the description is being given of a single function printer that implements only a print function as an example of the printer 105, a multi-function printer (a multi-function peripheral) that includes both a scan function and a fax function may be used.

A description will be given of a software configuration of each device in the system according to the present exemplary embodiment with reference to FIGS. 3A to 3D.

Figure 3A:
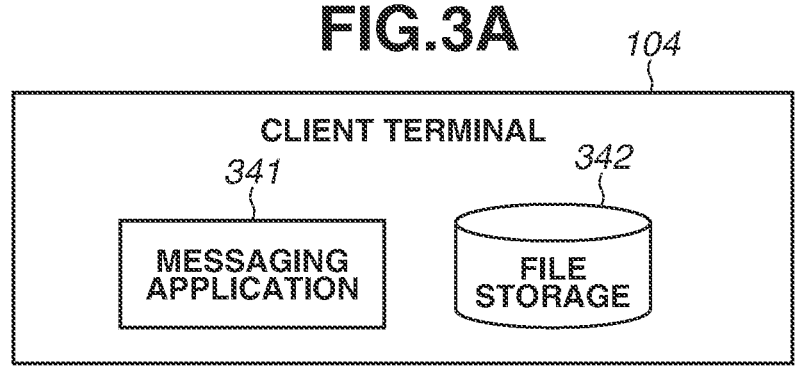
FIGS. 3A to 3D are diagrams illustrating respective software configurations of the client terminal and various servers.

FIG. 3A is a block diagram illustrating a software configuration of the client terminal 104. A messaging application 341 is a software application that plays a role as an interface with the user in a network service such as a business chat. Specifically, the messaging application 341, for example, accepts an input of a message by the user from the operation unit 247 and transmits the message to the message application server 101, and accepts the user's instruction for uploading a file and transmits the file to the message application server 101. If a message is input from another user to the messaging application 341, the messaging application 341 receives a notification from the message application server 101 and causes the display unit 246 to display the message in real time. A type of the message may be, in addition to a typical character string and image, a user interface (UI) control component (a component on a graphical user interface (GUI)), such as a button or a combo box, which is transmitted from the print bot server 102 or the like. The messaging application 341 also plays a role in transmitting predetermined action information to the message application server 101 in response to the user's operation of the UI control component. A file storage 342 is an area for saving a user file prepared in the storage unit 244 of the client terminal 104, and the user can save a freely-selected file including a file created in another application (not illustrated) in the file storage 342. The messaging application 341 has authority to access the file storage 342.

Figure 3B:
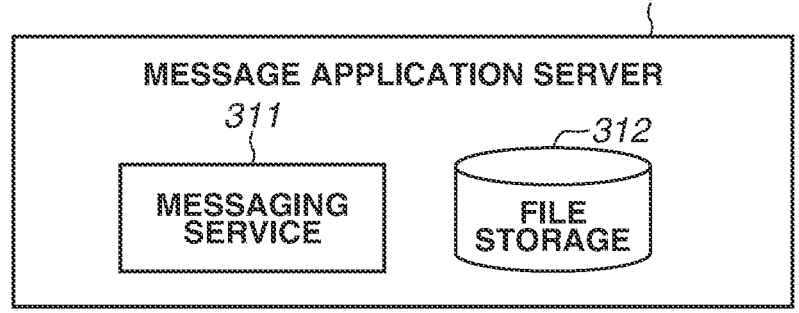

FIG. 3B is a block diagram illustrating a software configuration of the message application server 101. A messaging service 311 is a software application that provides a network service such as a business chat. The messaging service 311 exchanges information with the plurality of client terminals 104 and the print bot server 102 connected to the network 106. The messaging service 311 manages users and exchanges information only with users and bots registered in advance. With this configuration, the messaging service 311 allows confidential information or the like to be shared. In the present exemplary embodiment, the registered users and bots are referred to as members. The messaging service 311 transmits a message received from a member to another member/other members in real time. The messaging service 311 saves a received file in a file storage 312 and notifies the other member(s). The messaging service 311, when receiving the action information described above, transmits the information to a server or the like registered in advance (e.g., the print bot server 102). The file storage 312 is an area prepared in the storage unit 214 of the message application server 101. Member information managed by the messaging service 311, and various messages and files received from the members are saved in the file storage 312 and used by the messaging service 311.

Figure 3C:
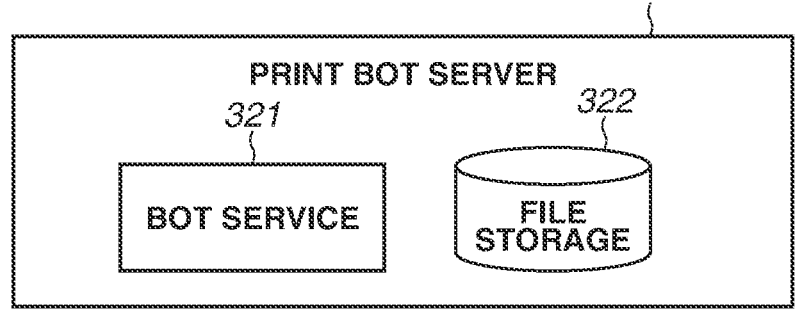

FIG. 3C is a diagram illustrating a software configuration of the print bot server 102. A bot service 321 receives a message or the like from the messaging service 311 of the message application server 101, and executes processing according to a content thereof. Specifically, the bot service 321, for example, transmits a message to the message application server 101 in collaboration with the print server 103 in response to a print request from the user, and gives a print instruction to the print server 103 in response to the print instruction. A file storage 322 is an area prepared in the storage unit 224 of the print bot server 102. A print setting and preview image used in a case where the bot service 321 creates a message are saved in the file storage 322 and used by the bot service 321.

Figure 3D:
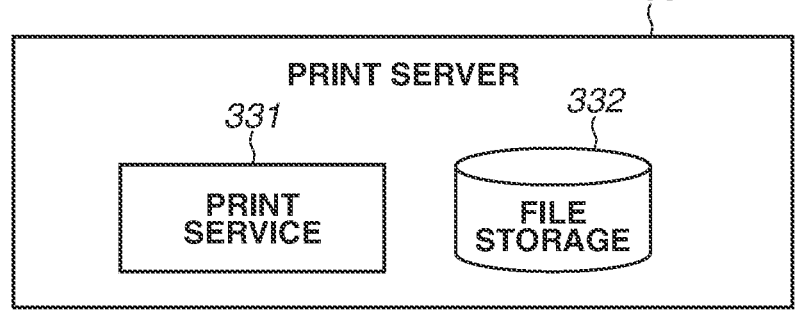

FIG. 3D is a diagram illustrating a software configuration of the print server 103. A print service 331 is a service to transmit print data received from the outside to a registered printer (e.g., the printer 105) via the network 106 to cause the printer to execute print. A file storage 332 is an area prepared in the storage unit 234 of the print server 103. User information registered in the print service 331, information regarding printer(s) of each user, a default print setting for each user, a print setting list, and the like are saved in the file storage 332 and used by the print service 331.

Subsequently, a description will be given of processing of each application or each service according to the present exemplary embodiment with reference to FIG. 4 to FIGS. 7A to 7D, FIG. 14, and FIGS. 21A and 21B.

Figure 4:
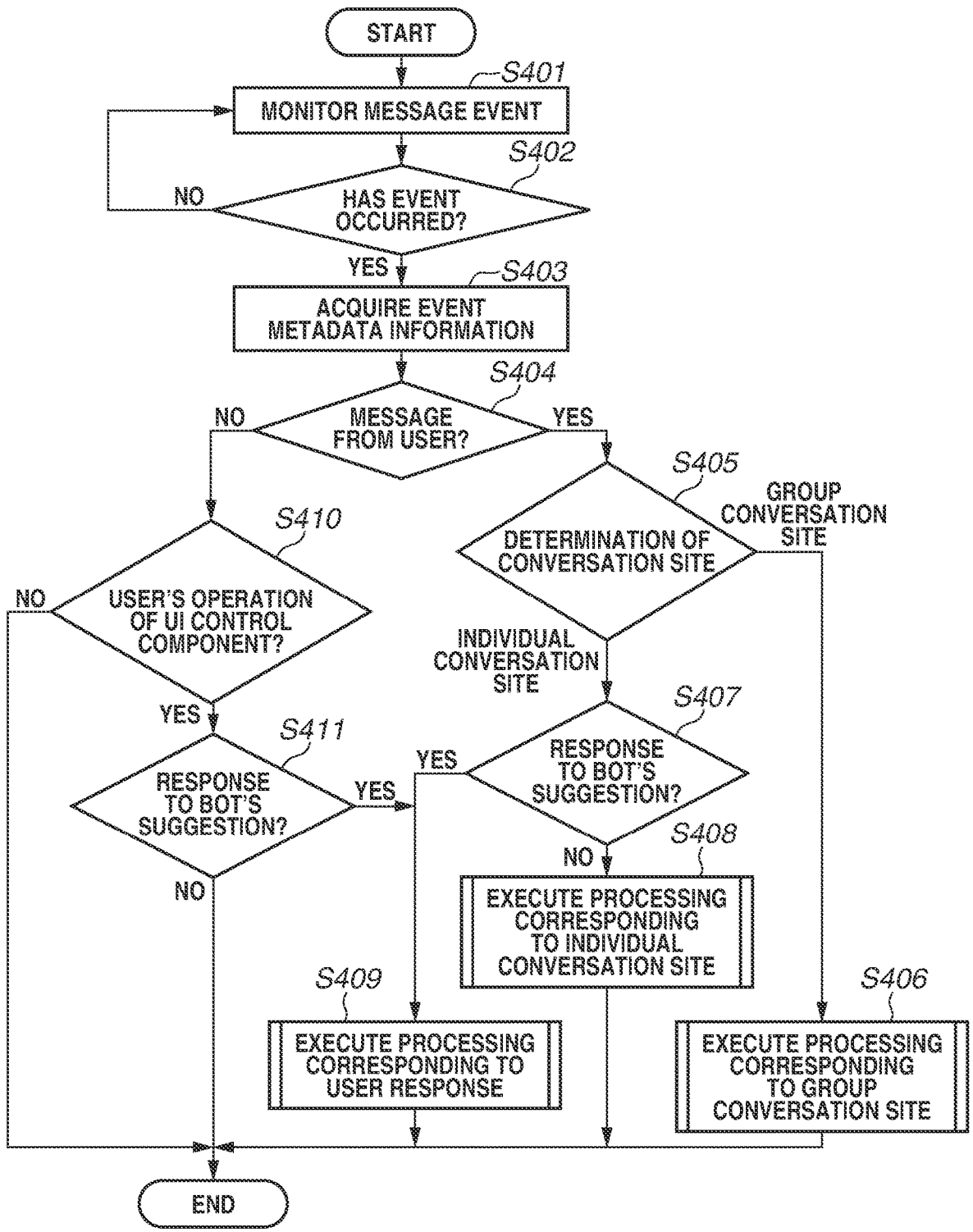
FIG. 4 is a flowchart illustrating an example of processing of a bot service according to a first exemplary embodiment.

The processing illustrated in FIG. 4 is executed by a CPU 222 loading a program of the bot service 321 stored in the storage unit 224 of the print bot server 102 to a memory 223 and executing the program.

In step S401, the bot service 321 monitors an event transmitted from the message application server 101. In step S402, the bot service 321 determines whether the event has occurred. If the event to be transmitted from the message application server 101 has occurred (YES in step S402), the processing proceeds to step S403. In step S403, the bot service 321 acquires event metadata information (refer to FIGS. 21A and 21B) as information of the event. In step S404, the bot service 321 determines whether the event that has occurred is a message from the user. For example, there is a method of determination using a specific parameter of print metadata. For example, FIGS. 21A and 21B each illustrate an example of the event metadata information, and a parameter of "event_type" indicates an event type. In this example, if a value 2101 of the parameter of "event_type" is "message" as illustrated in FIG. 21A, the parameter indicates that the event is the message from the user. If the bot service 321 determines that the event is the message from the user (YES in step S404), the processing proceeds to step S405. In step S405, the bot service 321 determines whether a conversation site is a "group conversation site" at which a plurality of members has conversation or an "individual conversation site" at which a member has one-to-one conversation with the bot. If the bot service 321 determines that the conversation site is the group conversation site (GROUP CONVERSATION SITE in step S405), the processing proceeds to step S406. In step S406, the bot service 321 executes processing corresponding to the group conversation site. Details will be described below with reference to FIG. 6. If the bot service 321 determines that the conversation site is the individual conversation site (INDIVIDUAL CONVERSATION SITE in step S405), the processing proceeds to step S407. In step S407, the bot service 321 determines from a content of the message that the message is a user response to a bot's suggestion. For example, the bot service 321 makes determination, for example, based on whether the massage includes a specific word such as "please print". If the bot service 321 determines that the message from the user is not the user response to the bot's suggestion (NO in step S407), the processing proceeds to step S408. In step S408, the bot service 321 executes processing corresponding to the individual conversation site.

If the bot service 321 determines that the message from the user is the response to the bot's suggestion (YES in step S407), the processing proceeds to step S409. In step S409, the bot service 321 executes processing corresponding to the user response. In a case where the bot's suggestion is whether to perform print, a response of approval to the suggestion is an instruction for print. Details will be described below with reference to FIG. 7A to 7D. In contrast, if the bot service 321 determines that the event that has occurred is not the message from the user (NO in step S404), the processing proceeds to step S410. In step S410, the bot service 321 determines whether the event is the user's operation of a UI control component such as a component indicating "YES" or "NO" arranged on a UI. If determining that the event is not the user's operation of the UI control component (NO in step S410), the bot service 321 determines that the event is not an event related to the bot service, and ends the processing with respect to the event in the bot service. If determining that the event is the operation of the UI control component (YES in step S410), the processing proceeds to step S411. In step S411, the bot service 321 determines whether the message is the response to the bot's suggestion. The bot service 321 makes determination, for example, based on whether an operation of a specific UI control component in the presented message is performed. If determining that the message is not the response to the bot's suggestion (NO in step S411), the bot service 321 determines that the event is not the event related to the bot service, and ends the processing with respect to the event in the bot service. If the bot service 321 determines that the message is the response to the bot's suggestion (YES in step S411), the processing proceeds to step S409. In step S409, the bot service 321 executes the processing corresponding to the user response.

Figure 5A:
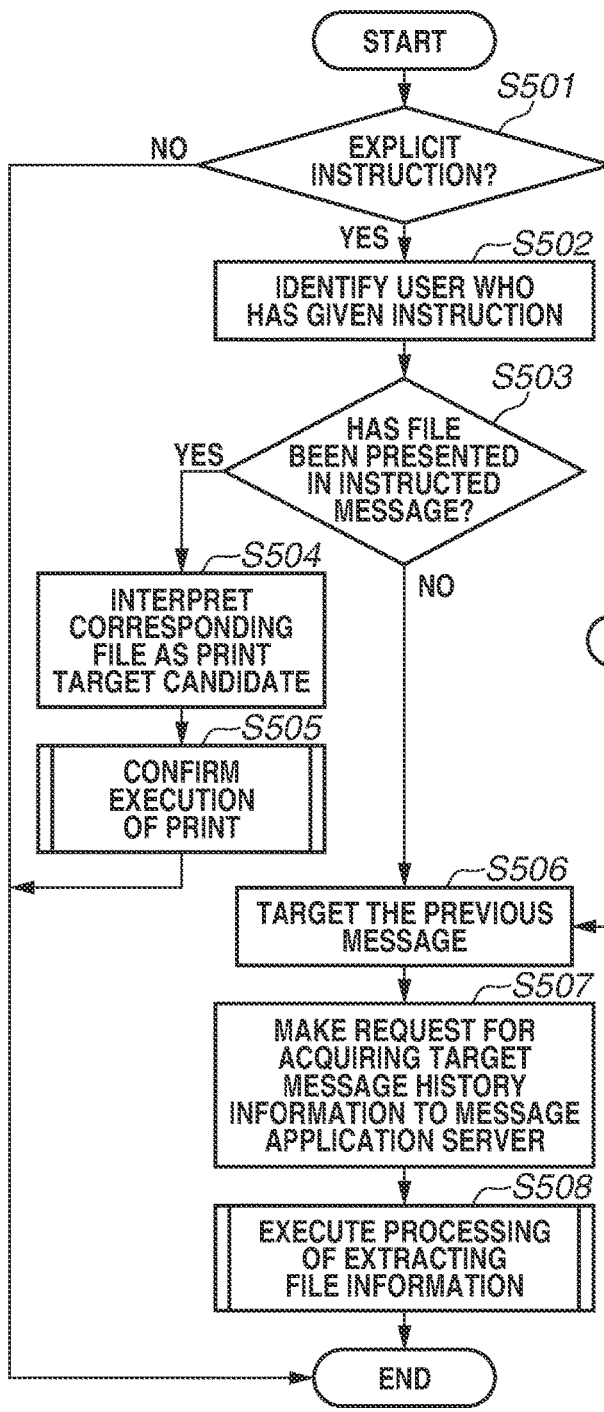
FIGS. 5A and 5B are flowcharts each illustrating an example of processing of the bot service according to the first exemplary embodiment.
Figure 5B:
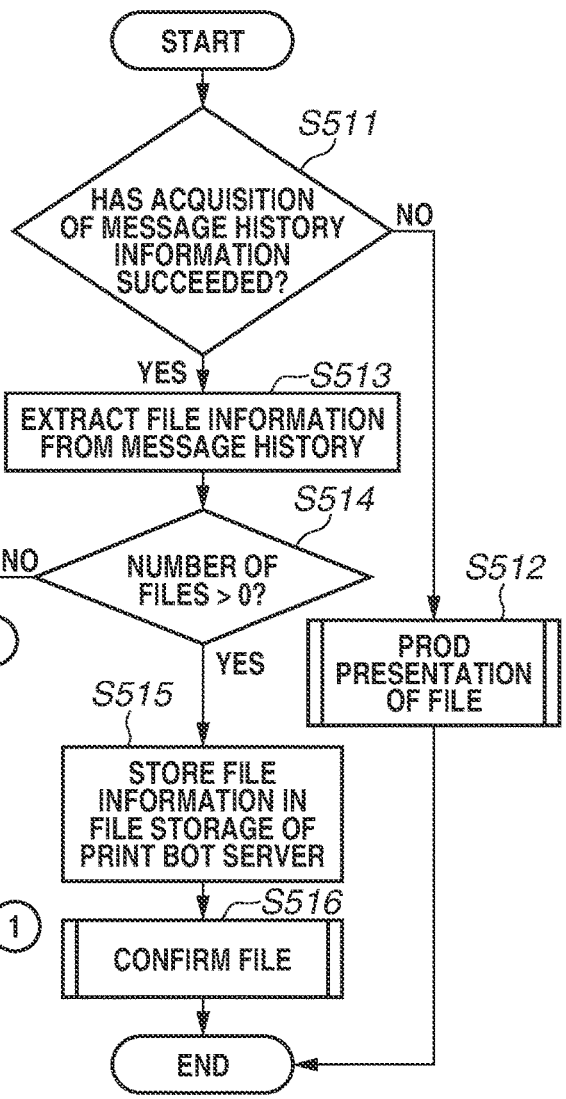

FIGS. 5A and 5B each illustrate an example of processing of detecting a print target file performed by the bot service 321 at the group conversation site.

Processing in step S501 of the flow in FIG. 5A is started as a result of determination by the bot service 321 that the conversation site is the group conversation site.

In step S501, the bot service 321 first analyzes a user message, and determines whether the user message is an explicit print instruction. For example, there is a method of determination using a specific parameter of print metadata and a term in the message. For example, FIGS. 21A and 21B each illustrate an example of the event metadata information, and the parameter of "event_type" indicates an event type. In this example, a value 2102 of the parameter of "event_type" being "mention" as illustrated in FIG. 21B indicates that the event is a message designating a specific party at the other end.

Figure 14:
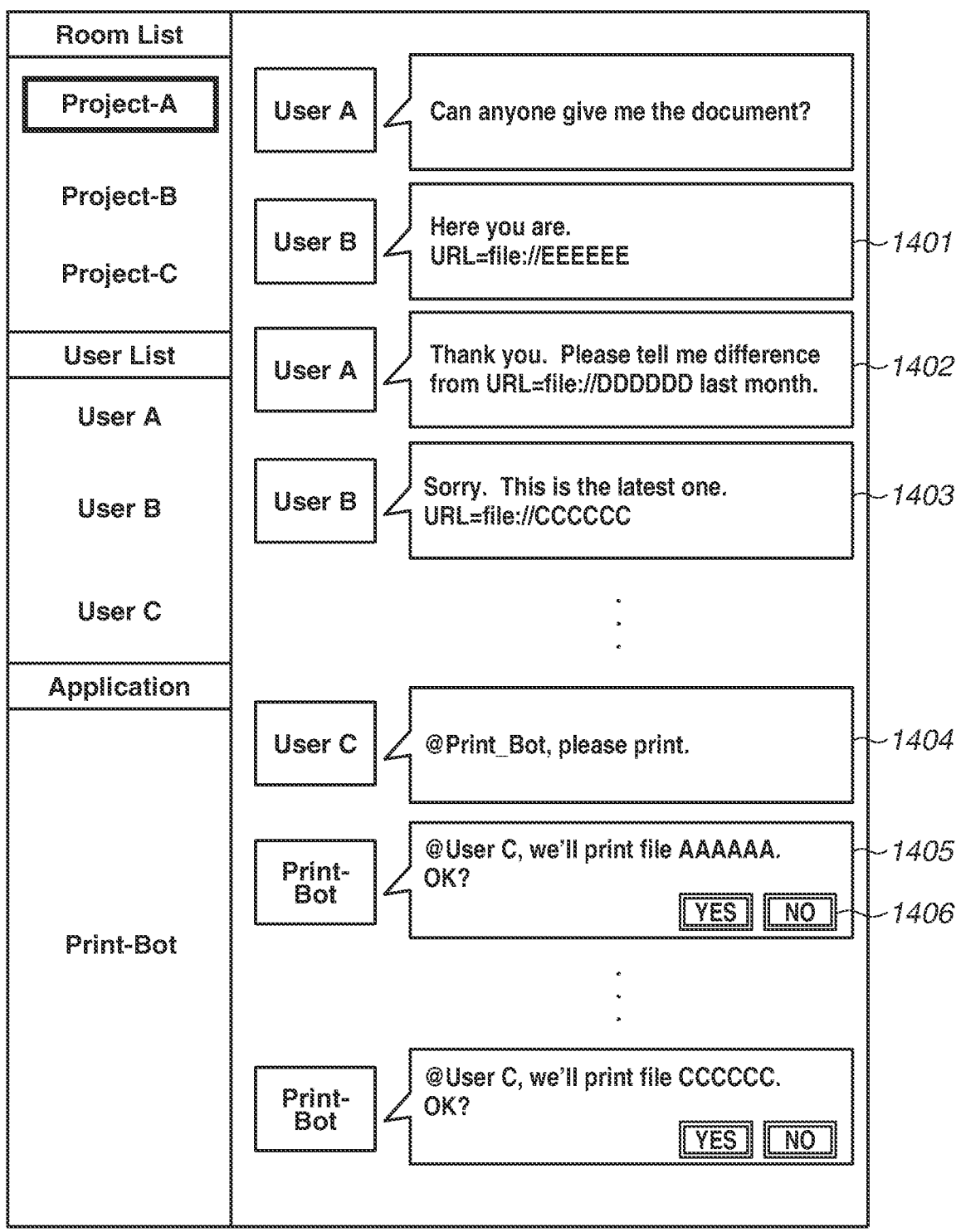
FIG. 14 is a diagram illustrating an example of conversation with the bot service according to the first exemplary embodiment.

Furthermore, if the message designates the print bot and a term related to print appears in the message in such a manner as "@Print_Bot, please print" as illustrated in a message 1404 in FIG. 14, the bot service 321 determines that the message is the explicit print instruction.

If the bot service 321 determines that the message is the explicit instruction (YES in step S501), the processing proceeds to step S502. In step S502, the bot service 321 identifies a user who has given the instruction. Subsequently, in step S503, the bot service 321 determines whether a file has been presented in the instructed message (the message in which the print instruction is determined to have been described). The file having been presented means that an identifier, such as a file name, which can uniquely identify the file (only needs to be an identifier that can uniquely identify the file desired to be printed, out of the plurality of files uploaded in the conversation service, and is not necessarily a globally unique identifier), has been described by the user. If the file has been presented (YES in step S503), the processing proceeds to step S504. In step S504, the bot service 321 selects the file as the print target. Subsequently, in step S505, the bot service 321 designates the identified user, and makes a suggestion for confirming the instruction. A specific example will be described below with reference to FIG. 7B. In contrast, if no file has been presented (NO in step S503), the processing proceeds to step S506. In step S506, the bot service 321 targets the previous message of the instructed message. In step S507, the bot service 321 transmits a request for acquiring target message history information to the message application server 101. In step S508, the bot service 321 executes processing of extracting file information (i.e., a file name) from the acquired message history information. A specific example will be described below with reference to FIG. 5B.

FIG. 5B illustrates an example of the processing of extracting the file information.

Processing in step S511 is started as a result of the request being made by the bot service 321 to the message application server 101 for acquiring the target message history information.

In step S511, the bot service 321 determines whether the acquisition of the message history information from the message application server 101 has succeeded. If the acquisition of the message history information has failed (NO in step S511), the processing proceeds to step S512. In step S512, the bot service 321 prods the user to present the file. That is, the bot service 321 posts a message to ask the user to describe the file name on the conversation service.

Details of file confirmation processing will be described below with reference to FIG. 7C. If the acquisition of the message history information has succeeded (YES in step S511), the processing proceeds to step S513. In step S513, the bot service 321 extracts file information from the message history information. In step S514, the bot service 321 determines whether the number of pieces of file information extracted in step S513 is greater than zero. If the number of pieces of file information is zero (NO in step S514), the processing proceeds to step S506. In step S506, the bot service 321 targets the next previous message. If the number of pieces of file information is greater than zero (YES in step S514), the processing proceeds to step S515. In step S515, the bot service 321 saves the file information in the file storage 322 of the print bot server 102. In step S516, the bot service 321 executes the file confirmation processing. That is, the bot service 321 posts a message, on the conversation service, to confirm the file name and confirm that a file to be printed is the file having the file name. With this configuration, in a case where the print instruction has been given in a state without presentation of the file, the bot service 321 identifies a file that has been uploaded before the print instruction is given and that has been uploaded most recently. The bot service 321 confirms that the print to be printed is this file. Details of the file confirmation processing will be described below with reference to FIG. 7C.

If the acquisition of the message history information has failed (NO in step S511), the processing proceeds to step S512. In step S512, the bot service 321 prods the user to present the print target file. A specific example will be described below with reference to FIG. 7D.

If the acquisition of the message history information has succeeded (YES in step S511, the processing proceeds to step S514. In step S514, the bot service 321 determines whether the file has been presented in the message. If no file has been presented in the message (NO in step S514), the processing proceeds to step S505. In step S505, the bot service targets the next previous message, and continues the acquisition of the message history information and a search for the file. If the file has been presented (YES in step S514), the processing proceeds to steps S515 and S516. In step S516, the bot service 321 performs the file confirmation processing to confirm that the file is the print target. Messages 1401 to 1403 in FIG. 14 each illustrate an example in a case where the file has been presented in the message. Details of the file confirmation processing will be described below with reference to FIG. 7C.

FIG. 6 illustrates an example of processing corresponding to the user response and executed by the bot service 321.

FIG. 6 illustrates the example in which, in response to the user response, the bot service 321 transmits various kinds of confirmation and prodding and transmits the print instruction and the file to the print server 103.

Processing in step S601 of the flow in FIG. 6 is started as a result of determination by the bot service 321 that the event that has occurred is the message or the user response by the operation of the UI control component.

In step S601, the bot service 321 first determines whether a type of the user response is a response to suggestion for print or a response to the confirmation of the print target file. For example, if a message paired with the UI control component operated by the user indicates the suggestion for print, the bot service 321 determines that the type of the user response is the response to the suggestion for print. If the message paired with the UI control component operated by the user indicates the confirmation of the print target file, the bot service 321 determines that the type of the user response is the response to the confirmation of the print target file. If determining that the type of the user response is the response to the suggestion for print (RESPONSE TO SUGGESTION FOR PRINT in step S601), the processing proceeds to step S602. In step S602, the bot service 321 determines whether the type of the user response is affirmation or negation. For example, in a case where the user replies "YES" in the message or presses a UI control button indicating "YES", the bot service 321 determines that the type of the user response is the affirmation. If the user replies "NO" in the message or presses a UI control button indicating "NO", the bot service 321 determines that the type of the user response is the negation. If the bot service 321 determines that the type of the user response is the affirmation (AFFIRMATION in step S602), the processing proceeds to step S603. In step S603, the bot service 321 determines whether user authentication has been made with respect to the print server 103. If the bot service 321 determines that the user authentication has already been performed (YES in step S603), the processing proceeds to step S604. In step S604, the bot service 321 acquires the print target file from the message application server 101.

Subsequently, in step S605, the bot service 321 transmits a print instruction and the afore-mentioned acquired file to the print server 103. In contrast, if determining that the type of the user response is the negation (NEGATION in step S602), the bot service 321 executes nothing. If determining that the user authentication has not been performed (NO in step S603), the processing proceeds to step S606. In step S606, the bot service 321 makes the user authentication with respect to the print server 103. In step S606, for example, the bot service 321 makes an inquiry of user authentication about whether the identified user exists to the printer server 103. Subsequently, in step S607, the bot service 321 makes determination about the user authentication of a response from the print server 103. If the bot service 321 determines that the user authentication has succeeded (SUCCEEDED in step S607), the processing proceeds to step S604. In step S604, the bot service 321 acquires the print target file from the message application server 101. Subsequently, in step S605, the bot service 321 transmits the print instruction and the afore-mentioned acquired file to the print server 103. If the bot service 321 determines that the user authentication has failed (FAILED in step S607), the processing proceeds to step S608. In step S608, the bot service 321 notifies the user that the user authentication has failed.

A specific example will be described below with reference to FIG. 7A. In contrast, if determining that the type of the user response is the response to the confirmation of the print target file (RESPONSE TO CONFIRMATION OF PRINT TARGET FILE in step S601), the processing proceeds to step S609. In step S609, the bot service 321 determines whether the type of the user response is affirmation or negation. For example, in a case where the user replies "YES" in the message or presses the UI control button indicating "YES", the bot service 321 determines that the response is the affirmation. Also in a case where the file has been selected from a drop-down list, the bot service 321 determines that the type of the user response is the affirmation. In a case where the user replies "NO" in the message or presses the UI control button indicating "NO", the bot service 321 determines that the response is the negation. If determining that the response is the affirmation (AFFIRMATION in step S609), the processing proceeds to step S610. In step S610, the bot service 321 interprets the file that is a target of the confirmation as a print target candidate. Subsequently, in step S611, the bot service 321 performs processing to confirm execution of print with the user. A specific example will be described below with reference to FIG. 7B. In contrast, if determining that the type of the user response is the negation (NEGATION in step S609), the processing proceeds to step S612. In step S612, the bot service 321 determines whether there is a remaining file candidate as the target of the confirmation. If there is no remaining file candidate (NO in step S612), the processing proceeds to step S615. In step S615, the bot service 321 executes processing to prod the user to present the print target file. A specific example will be described below with reference to FIG. 7D. If there is the remaining file candidate (YES in step S612), the processing proceeds to step S613. In step S613, the bot service 321 selects the next file candidate from a file list. In step S614, the bot service 321 executes the file confirmation processing to the user. A specific example will be described below with reference to FIG. 7C.

FIGS. 7A to 7D illustrate examples of generating and transmitting various messages in/from the bot service 321.

FIG. 7A illustrates a more specific example of making notification that the authentication has failed.

Processing in step S701 of the flow in FIG. 7A is started as a result of determination by the bot service 321 that the user authentication has failed.

In step S701, the bot service 321 generates a message that the user authentication has failed. Subsequently, in step S702, the bot service 321 generates UI control components for a user response. For example, the bot service 321 generates buttons such as the "YES" and "NO" buttons as the UI control components.

Subsequently, in step S703, the bot service 321 combines the generated message and the UI control components and transmits the combined message to the message application server 101.

FIG. 7B illustrates a more specific example of suggesting confirmation of execution of print.

Processing in step S711 of the flow in FIG. 7B is started as a result of interpretation of the file as the print target candidate by the bot service 321.

In step S711, the bot service 321 first generates a message asking the user to confirm execution of print. Subsequently, in step S712, the bot service 321 generates the UI control components for the user response. For example, the bot service 321 generates the buttons such as the "YES" and "NO" buttons as the UI control components. A message 1405 illustrated in FIG. 14 is an example of combining the message to suggest confirmation of execution of print and the UI control components. Subsequently, in step S713, the bot service 321 combines the generated message and the UI control components and transmits the combined message to the message application server 101. That is, the bot service 321 posts a result of combining the message and UI control components described above on the message application server 101.

FIG. 7C illustrates a more specific example of suggesting confirmation of the file.

Processing in step S721 of the flow in FIG. 7C is started as a result of detection of the file as the print target candidate by the bot service 321.

In step S721, the bot service 321 first generates a message asking the user to confirm that the file is the print target as described in the message 1405 in FIG. 14. Subsequently, in step S722, the bot service 321 generates the UI control components for the user response. For example, the bot service 321 generates the buttons such as the "YES" and "NO" buttons as the UI control components, as buttons 1406 illustrated in FIG. 14. Subsequently, in step S723, the bot service 321 combines the generated message and the UI control components and transmits the combined message to the message application server 101.

FIG. 7D illustrates a more specific example of prodding presentation of the file.

Processing in step S731 of the flow in FIG. 7D is started as a result of failure of the bot service 321 in detection of the file as the print target candidate.

Figure 15:
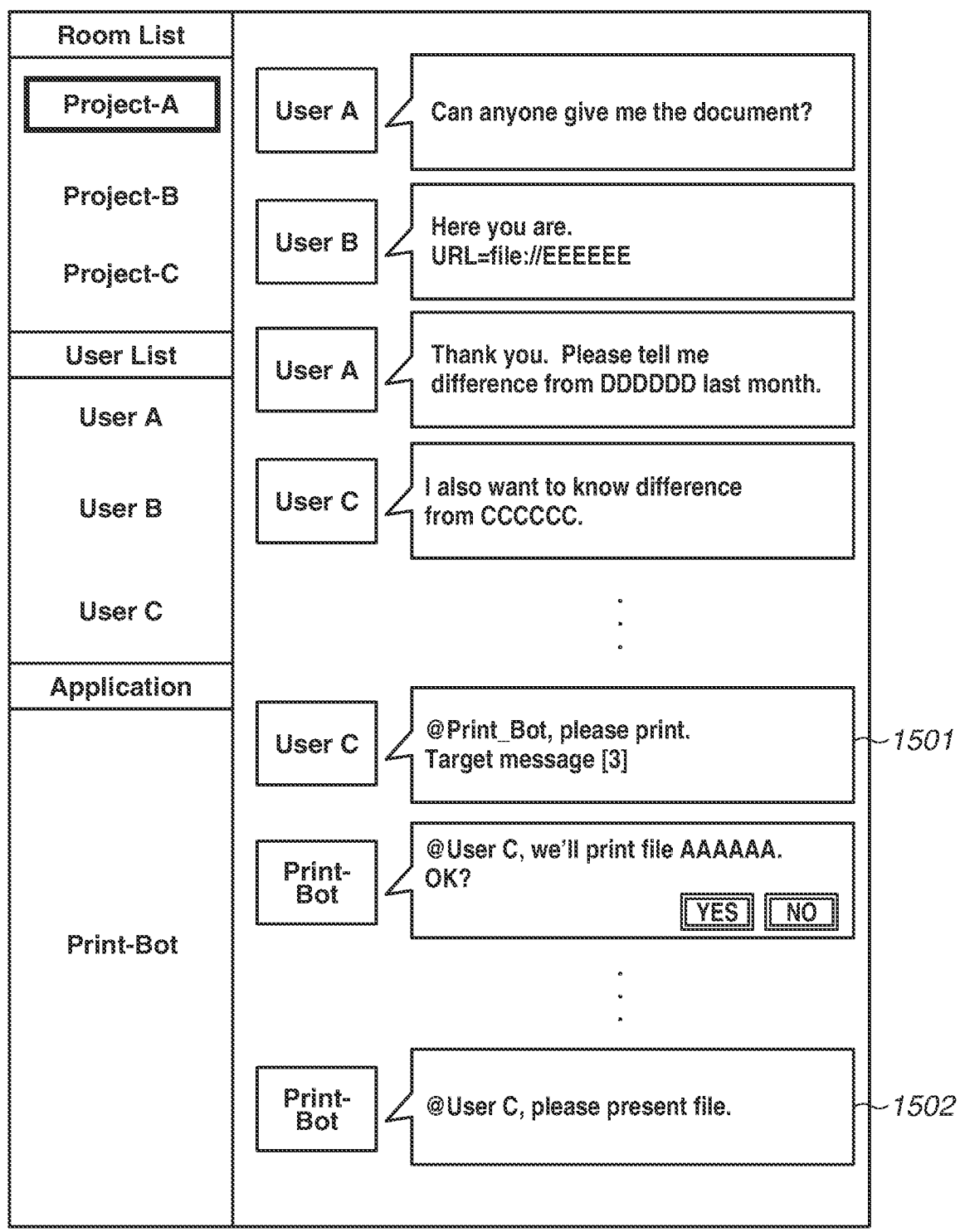
FIG. 15 is a diagram illustrating an example of conversation with the bot service according to the second exemplary embodiment.

In step S731, the bot service 321 first generates a message prodding presentation of the file as described in a message 1502 in FIG. 15. Subsequently, in step S732, the bot service 321 generates the UI control components for the user response. For example, the bot service 321 generates the buttons such as the "YES" and "NO" buttons as the UI control components. Subsequently, in step S733, the bot service 321 combines the generated message and the UI control components and transmits the combined message to the message application server 101.

As described above, the bot service 321 can detect as a print target file even a file that has been presented during group conversation and embedded in other users' conversation by presenting the user a candidate for the print target file (a name of a candidate file) with reference to the message history information.

Since the file exists in the message application server 101 until the user confirms the file as the print target, it is possible to identify the print target file without the need for the print bot side to hold the message and the file.

If the file has been already presented at the conversation site, there is no need for the user to present the print target file anew every time, thereby reducing workloads of a user operation and increasing convenience.

In the first exemplary embodiment, the description has been given of the example of collecting messages retrospectively message by message, and confirming every detected file with the user.

In a second exemplary embodiment, a description will be given of a method of detecting a file retrospectively to the number of messages designated by the user (a predetermined number of messages designated by the user), i.e., with reference to a message history retrospectively.

Specific processing according to the present exemplary embodiment will be described with reference to FIGS. 8A and 8B, and FIG. 15.

Only a difference from the first exemplary embodiment will be described here. Since a system configuration, a hardware/software configuration, and each processing flow are the same as those of the first exemplary embodiment with some exceptions, a description thereof will be omitted.

Figure 8A:
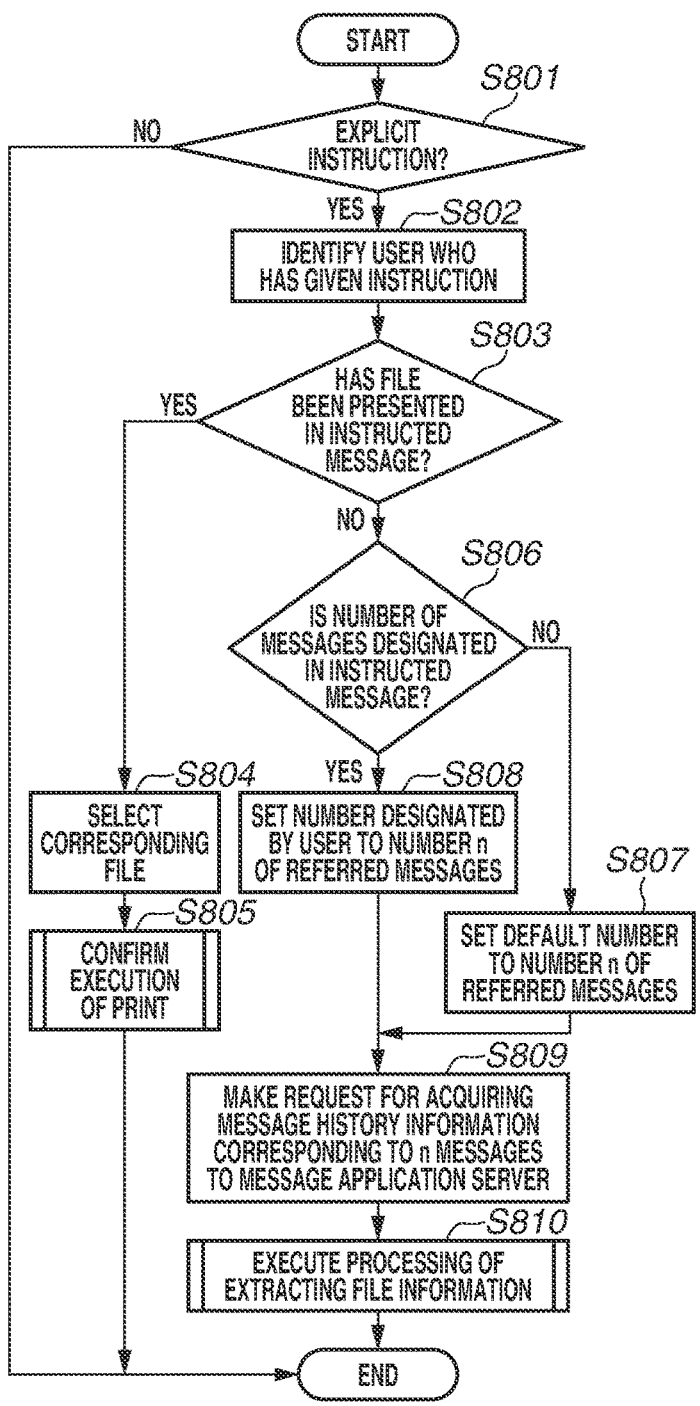
FIGS. 8A and 8B are flowcharts each illustrating an example of processing of a bot service according to a second exemplary embodiment.
Figure 8B:
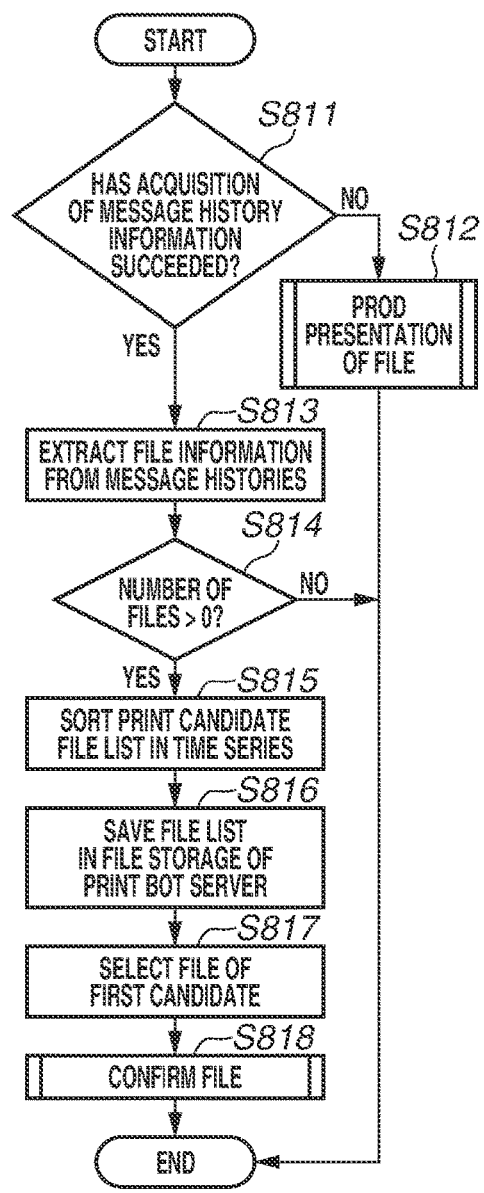

FIGS. 8A and 8B illustrate an example in which the bot service 321 detects a file with reference to the message history retrospectively to the number of messages designated by the user at the group conversation site.

Processing in step S801 of the flow in FIG. 8A is started as a result of determination by the bot service 321 that the conversation site is the group conversation site.

Since processing in steps S801 to S805 is the same as the processing in steps S501 to S505 illustrated in FIG. 5A, a description thereof will be omitted.

If the bot service 321 determines that no file has been presented in the message (NO in step S803), the processing proceeds to step S806. In step S806, the bot service 321 determines whether the number of messages for which the message history is referred to is designated in the instructed message. An example of a message designating the number of messages is illustrated as a message 1501 in FIG. 15.

In the message 1501, the user designates the number of messages as "@Print_Bot please print. Target message [3]". If the number of messages is designated in the instructed message (YES in step S806), the processing proceeds to step S808. In step S808, the bot service 321 sets the number designated by the user to a threshold n of the number of referred messages.

If the number of messages is not designated in the instructed message (NO in step S806), the processing proceeds to step S807. In step S807, the bot service 321 sets a predetermined default value to the threshold n of the number of referred messages. Subsequently, in step S809, the bot service 321 makes a request to the message application server 101 for acquiring the message history information corresponding to the threshold n. In step S810, the bot service 321 executes the processing of extracting the file information from the acquired message history information. A specific example will be described below with reference to FIG. 8B.

FIG. 8B illustrates an example of the processing of extracting the file information.

Processing in step S811 is started as a result of the request being made by the bot service 321 to the message application server 101 for acquiring the message history information corresponding to the threshold n.

In step S811, the bot service 321 determines whether the acquisition of the message history information from the message application server 101 has succeeded. If the acquisition of the message history information has failed (NO in step S811), the processing proceeds to step S812. In step S812, the bot service 321 prods the user to present the file.

Figure 19:
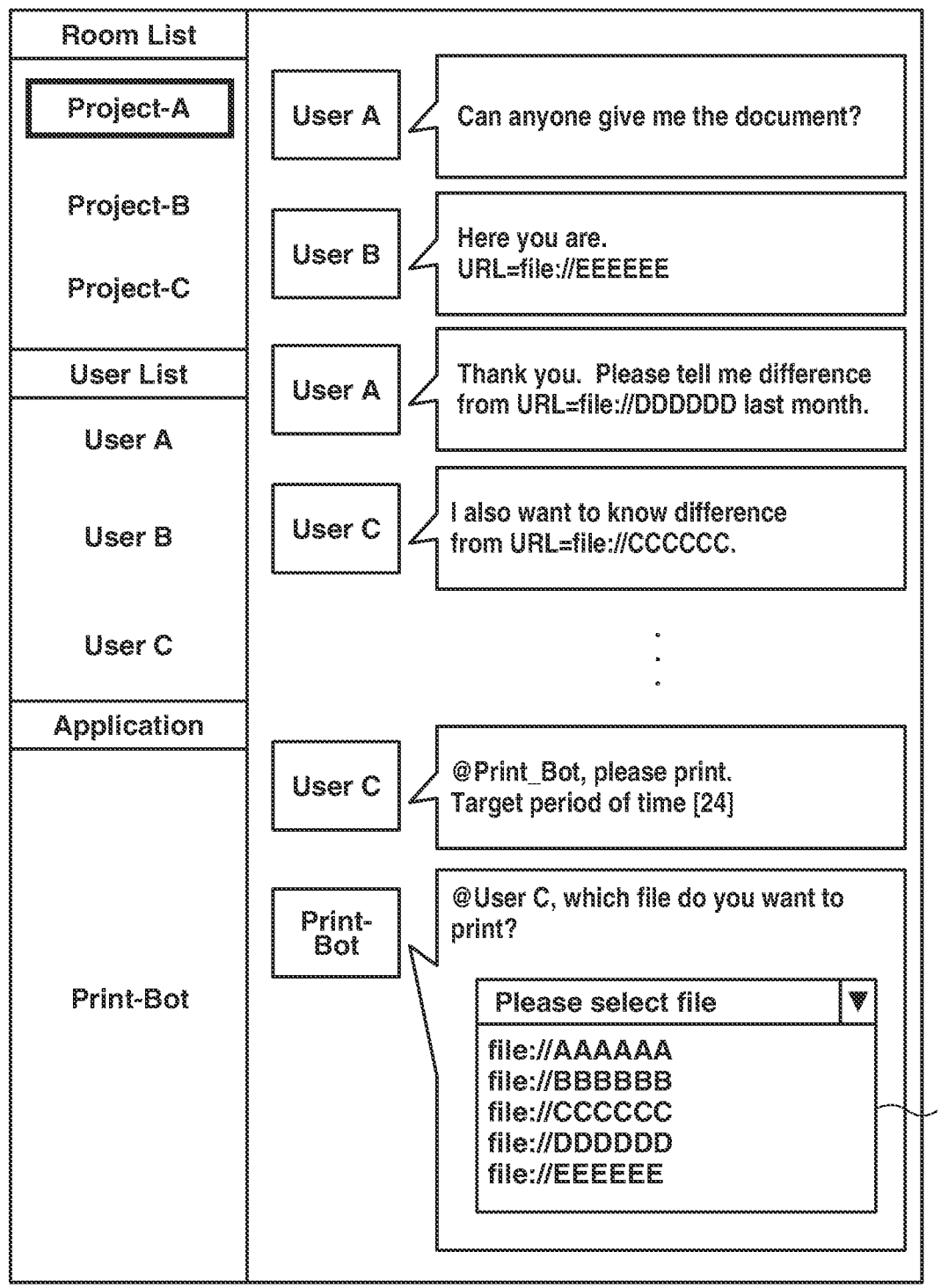
FIG. 19 is a diagram illustrating an example of conversation with the bot service according to the sixth exemplary embodiment.

Since details of the processing of prodding presentation of the file are the same as those of the processing in FIG. 7D, a description thereof will be omitted. If the acquisition of the message history information has succeeded (YES in step S811), the processing proceeds to step S813. In step S813, the bot service 321 extracts the file information from the message history information. In step S814, the bot service 321 determines whether the number of pieces of file information extracted in step S813 is greater than zero. If the number of pieces of file information is zero (NO in step S814), the processing proceeds to step S812. In step S812, the bot service 321 prods the user to present the file. If the number of pieces of file information extracted in step S813 is greater than zero (YES in step S814), the processing proceeds to step S815. In step S815, the bot service 321 sorts the contents of a print candidate file list in time series. Subsequently, in step S816, the bot service 321 saves the file list in the file storage 322 of the print bot server 102. Subsequently, in step S817, the bot service 321 selects a file at the head of the file list as a first candidate. Specifically, the bot service 321 posts names of candidate files in an aligned manner in the descending order from the latest file on the conversation service. At this time, the latest file (a file uploaded to the conversation service most recently) is displayed as the first candidate at the top. A name of a file is displayed in the lower order in the list as the earlier the file has been uploaded to the conversation service. In step S818, the bot service 321 executes the file confirmation processing. Since details of the file confirmation processing are the same as those of the processing in step FIG. 7C, a description thereof will be omitted. A displayed screen is as illustrated in FIG. 19.

According to the present exemplary embodiment, the bot service 321 detects the print target file with reference only to the designated number of messages, as described above.

If the bot service 321 refers to all the messages, the number of messages may become enormous. In this respect, the bot service 321 can avoid the issue and present the file candidates for the print target promptly to the user.

In the second exemplary embodiment, the description has been given of the method of detecting the print target file with reference only to the designated number of messages.

In a third exemplary embodiment, a description will be given of a method of detecting the print target file with reference only to messages within a designated period of time.

Figure 16:
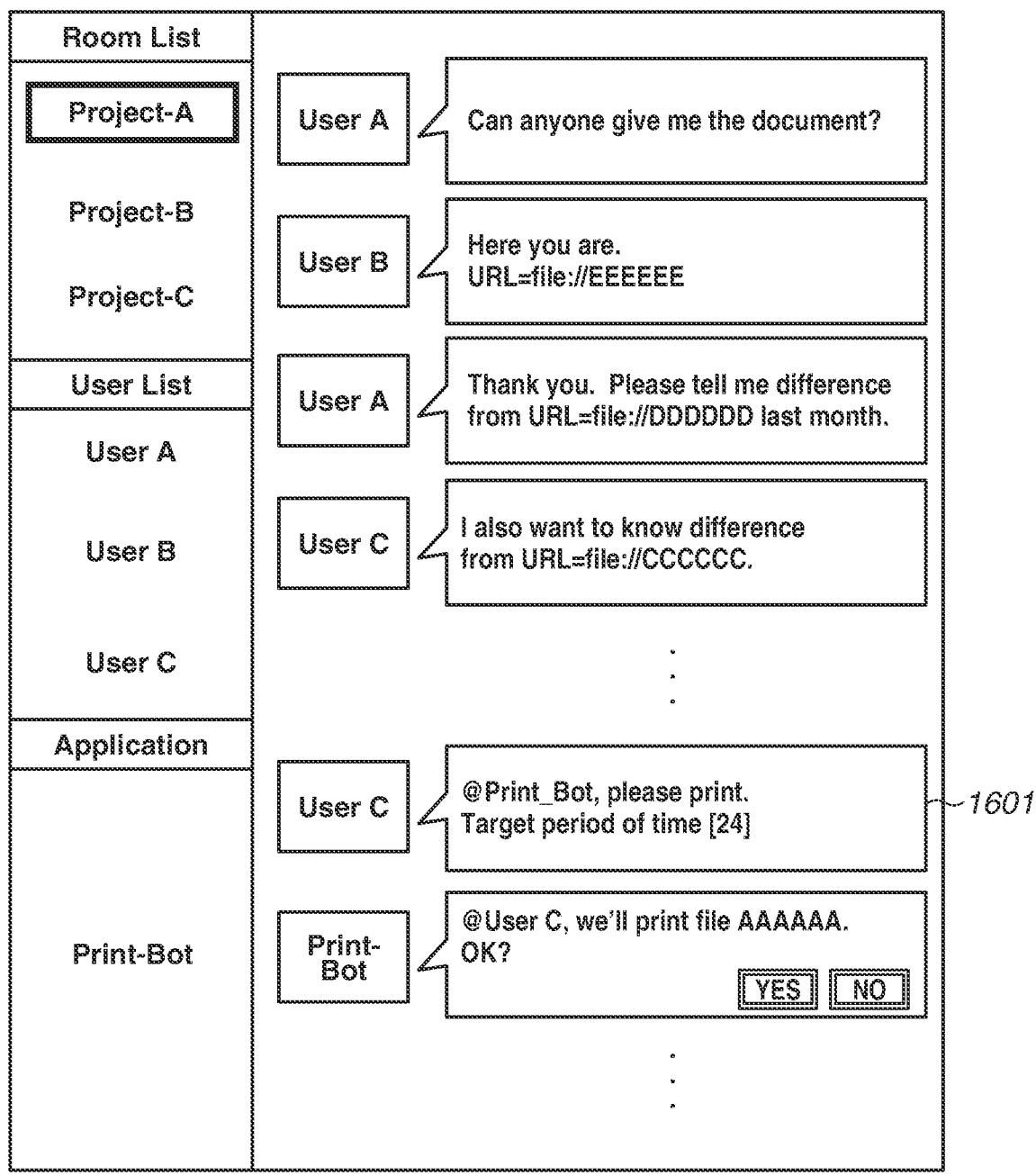
FIG. 16 is a diagram illustrating an example of conversation with the bot service according to the third exemplary embodiment.

Specific processing according to the present exemplary embodiment will be described with reference to FIGS. 9 and 16.

Only a difference from the first and second exemplary embodiments will be described here. Since a system configuration, a hardware/software configuration, and each processing flow are the same as those of the first exemplary embodiment with some exceptions, a description thereof will be omitted.

Figure 9:
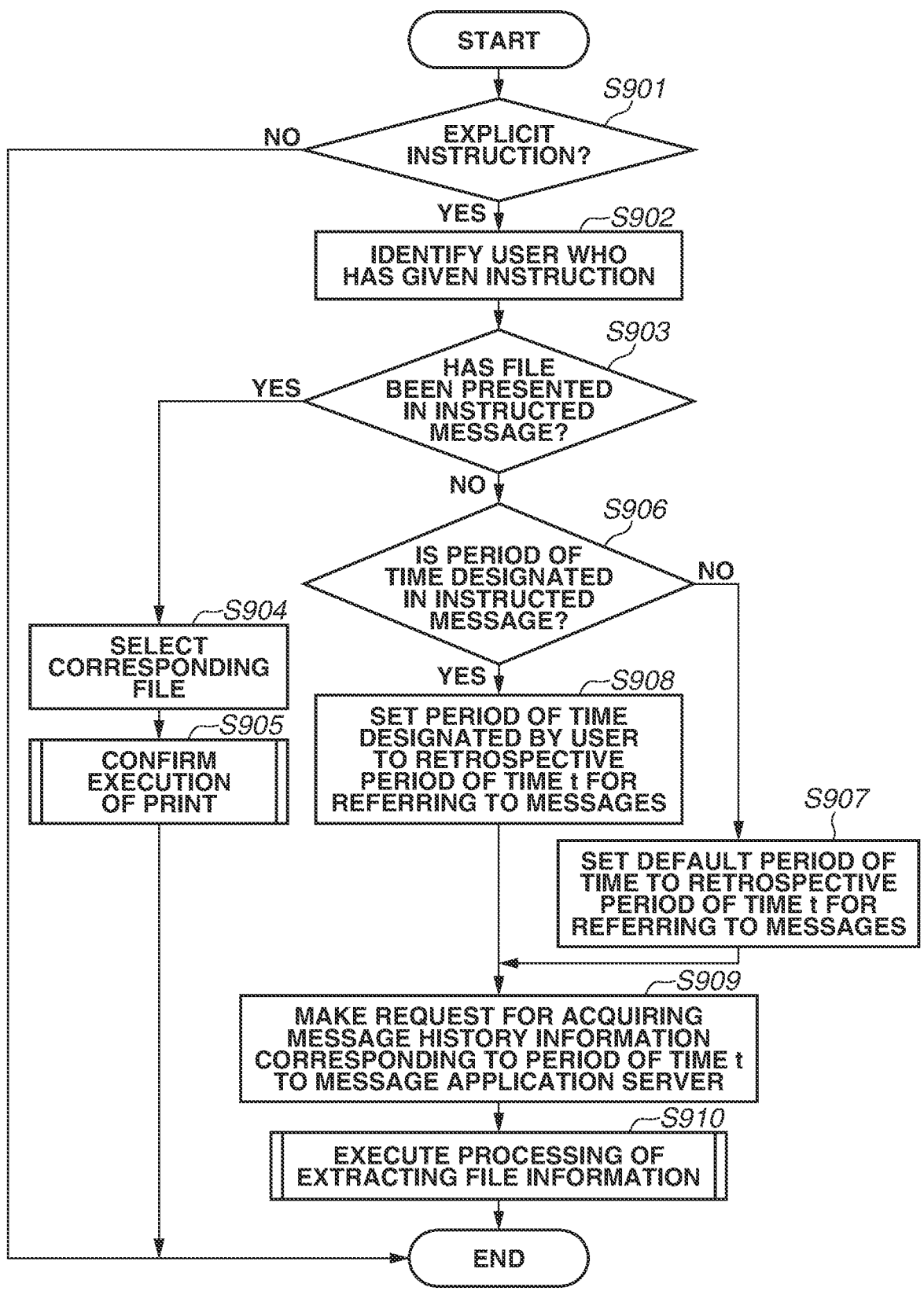
FIG. 9 is a flowchart illustrating an example of processing of a bot service according to a third exemplary embodiment.

FIG. 9 illustrates an example in which the bot service 321 detects a file with reference to a message history in a retrospective period of time designated by the user at the group conversation site.

Processing in step S901 of the flow in FIG. 9 is started as a result of determination by the bot service 321 that the conversation site is the group conversation site.

Since processing in step S901 to S905 is the same as the processing in steps S801 to S805 illustrated in FIG. 8A, a description thereof will be omitted. If the bot service 321 determines that no file has been presented in the instructed message (NO in step S903), the processing proceeds to step S906. In step S906, the bot service 321 determines whether a period of time for referring to the message history is designated in the instructed message. If the period of time is designated in the instructed message (YES in step S906), the processing proceeds to step S908. In step S908, the bot service 321 sets the period of time designated by the user to a threshold t of a period of time for referring to messages. An example of a message to designate the period of time is illustrated as a message 1601 in FIG. 16. In the message 1601, the user designates the period of time as "@Print_Bot, please print. Target time [24]". If the period of time is not designated in the instructed message (NO in step S906), the processing proceeds to step S907. In step S907, the bot service 321 sets a predetermined default period of time to the threshold t of the period of time for referring to messages. Subsequently, in step S909, the bot service 321 makes a request to the message application server 101 for acquiring the message history information within a period of time corresponding to the threshold t in the past. In step S910, the bot service 321 executes the processing of extracting the file information from the acquired message history information. Since a specific example of the processing of extracting the file information is the same as that illustrated in FIG. 8B, a description thereof will be omitted.

According to the present exemplary embodiment, the bot service 321 detects the print target file with reference only to the messages in the designated period of time.

If the bot service 321 refers to all the messages, the number of messages may become enormous. In this respect, the bot service 321 can avoid the issue and present the file candidates for the print target promptly to the user.

In the second exemplary embodiment, the description has been given of the method of detecting the print target file with reference only to the designated number of messages.

In a fourth exemplary embodiment, a description will be given of a method of detecting the print target file with reference only to a message from a designated user.

Figure 17:
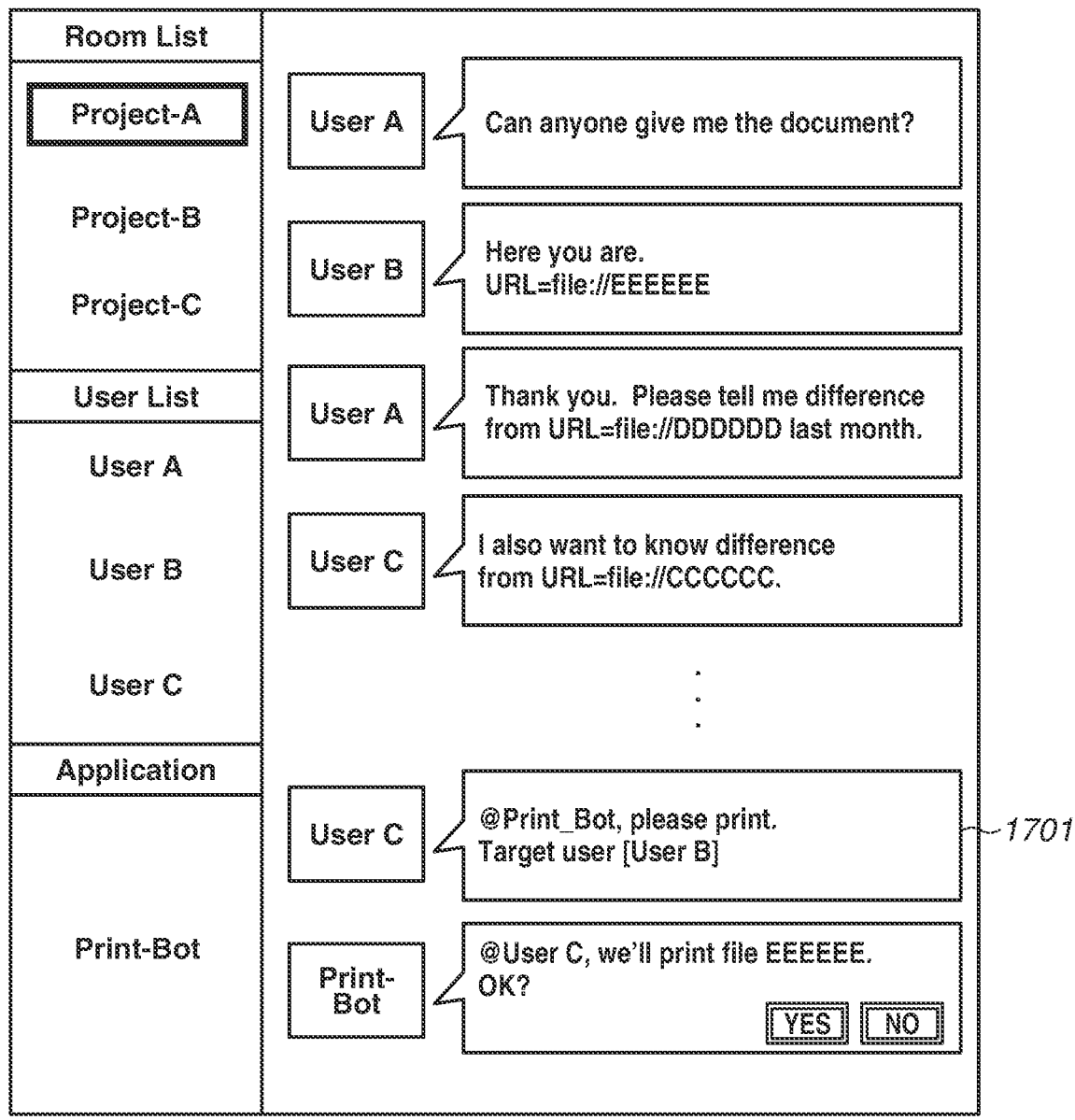
FIG. 17 is a diagram illustrating an example of conversation with the bot service according to the fourth exemplary embodiment.

Specific processing according to the present exemplary embodiment will be described with reference to FIGS. 10 and 17.

Only a difference from the first and second exemplary embodiments will be described here. Since a system configuration, a hardware/software configuration, and each processing flow are the same as those of the first exemplary embodiment with some exceptions, a description thereof will be omitted.

Figure 10:
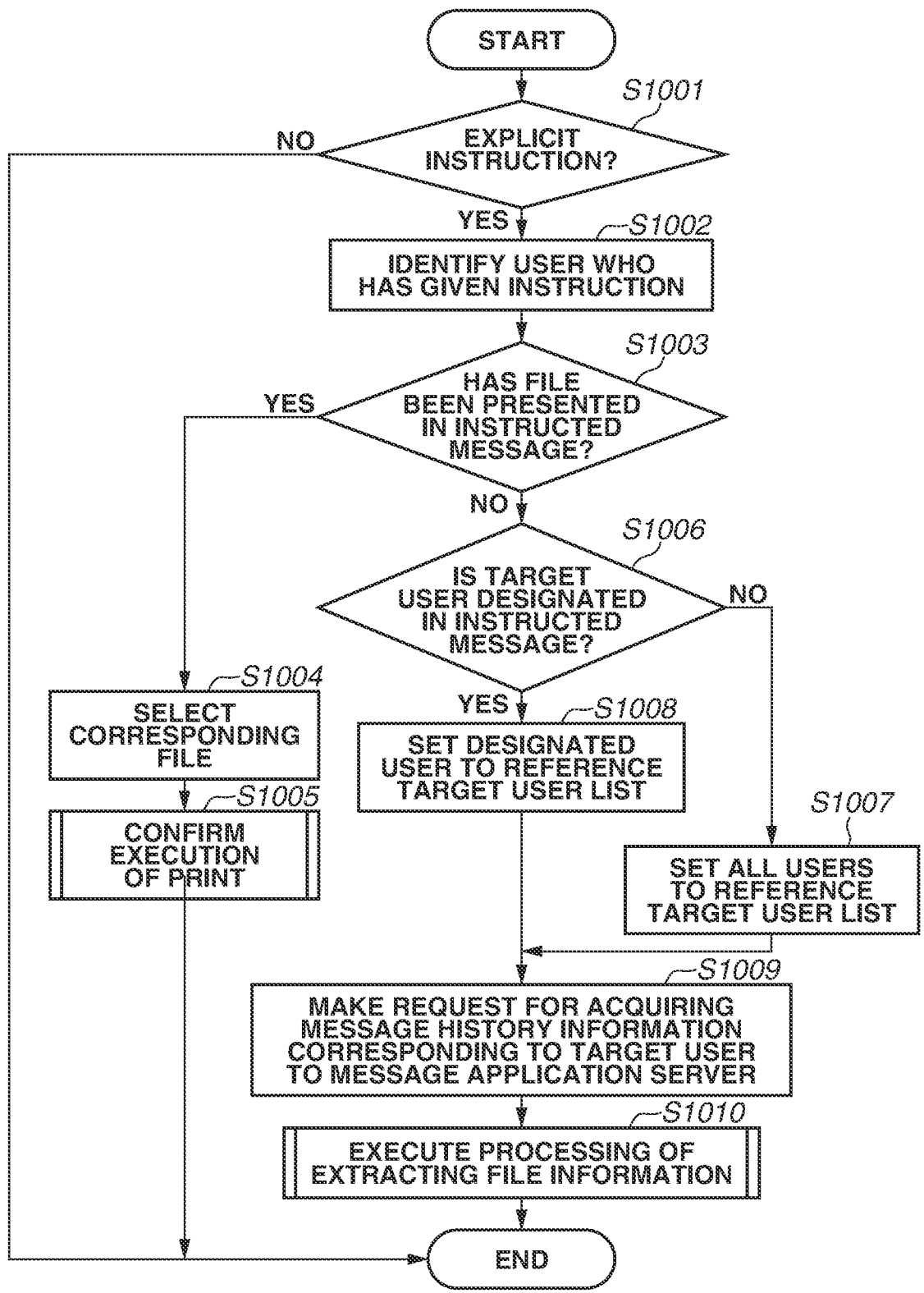
FIG. 10 is a flowchart illustrating an example of processing of a bot service according to a fourth exemplary embodiment.

FIG. 10 illustrates an example in which the bot service 321 detects the print target file with reference only to the message from the designated user at the group conversation site.

Processing in step S1001 of the flow in FIG. 10 is started as a result of determination by the bot service 321 that the conversation site is the group conversation site.

Since processing in steps S1001 to S1005 is the same as the processing in steps S801 to S805 illustrated in FIG. 8A, a description thereof will be omitted.

If the bot service 321 determines that no file has been presented in the instructed message (NO in step S1003), the processing proceeds to step S1006. In step S1006, the bot service 321 determines whether a target user for referring to the message history is designated in the instructed message. If the target user is designated in the instructed message (YES in step S1006), the processing proceeds to step S1008. In step S1008, the bot service 321 sets the designated user to a target user list for referring to the messages. An example of a message to designate the target user is illustrated as a message 1701 in FIG. 17. In the message 1701, the user designates the user as "@Print_Bot, please print. Target user [User B]". If no specific user is designated in the instructed message (NO in step S1006), the processing proceeds to step 1007. In step S1007, the bot service 321 sets all the users to the target user list for referring to the messages. Subsequently, in step S1009, the bot service 321 makes a request for acquiring the message history information corresponding to the user set to the target user list to the message application server 101. In step S1010, the bot service 321 executes the processing of extracting the file information from the acquired message history information. Since a specific example of the processing of extracting the file information is the same as that illustrated in FIG. 8B, a description thereof will be omitted.

According to the present exemplary embodiment, the bot service 321 detects the print target file with reference only to the message from the designated user, as described above.

If the bot service 321 refers to all the messages, the number of messages may become enormous. In this respect, the bot service 321 can avoid the issue and present the file candidates for the print target promptly to the user.

In the second exemplary embodiment, the description has been given of the method of detecting the print target file with reference only to the designated number of messages.

In a fifth exemplary embodiment, a description will be given of a method of detecting the print target file with reference only to a message including a designated key word.

Figure 18:
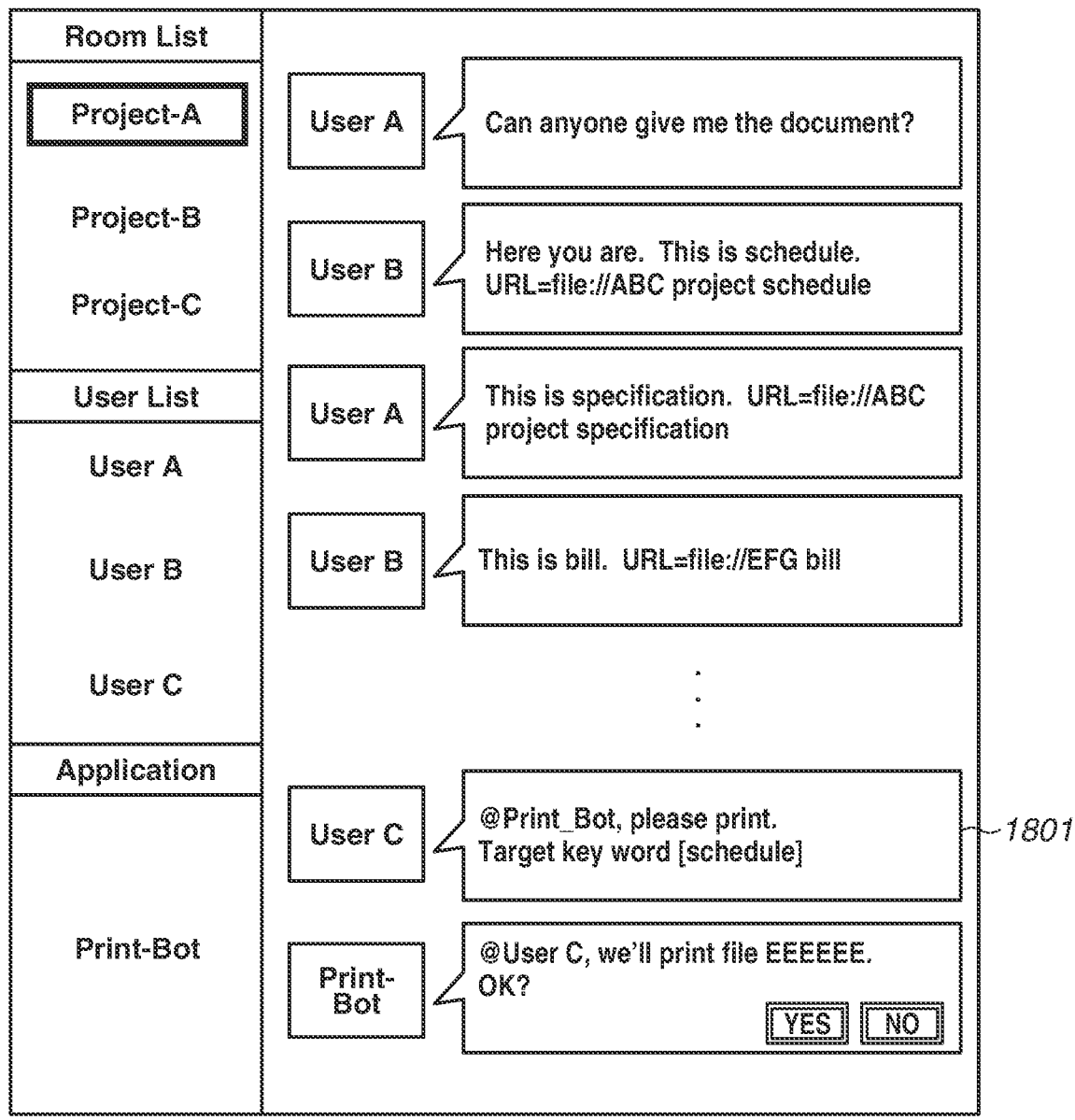
FIG. 18 is a diagram illustrating an example of conversation with the bot service according to the fifth exemplary embodiment.

Specific processing according to the present exemplary embodiment will be described with reference to FIGS. 11 and 18.

Only a difference from the first and second exemplary embodiments will be described here. Since a system configuration, a hardware/software configuration, and each processing flow are the same as those of the first exemplary embodiment with some exceptions, a description thereof will be omitted.

Figure 11:
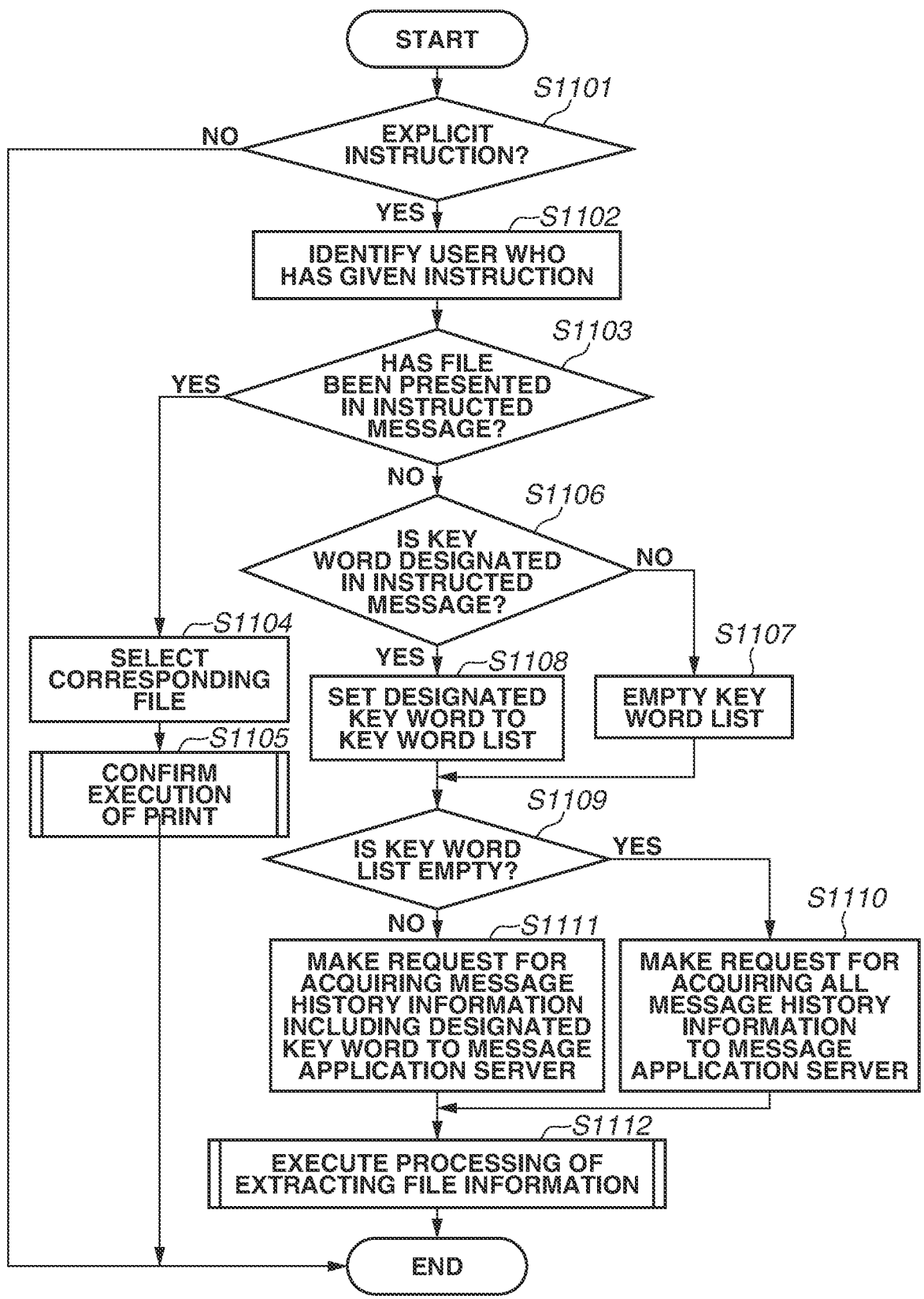
FIG. 11 is a flowchart illustrating an example of processing of a bot service according to a fifth exemplary embodiment.

FIG. 11 illustrates an example in which the bot service 321 detects the print target file with reference only to the message including the designated key word at the group conversation site.

Processing in step S1101 of the flow in FIG. 11 is started as a result of determination by the bot service 321 that the conversation site is the group conversation site.

Since processing in steps S1101 to S1105 is the same as the processing in steps S801 to S805 illustrated in FIG. 8A, a description thereof will be omitted.

If the bot service 321 determines that no file has been presented in the instructed message (NO in step S1103), the processing proceeds to step S1106. In step S1106, the key word is designated in the instructed message. If the key word is designated in the instructed message (YES in step S1106), the processing proceeds to step S1108. In step S1108, the bot service 321 sets the key word designated by the user to a key word list. An example of a message to designate the key word is illustrated as a message 1801 in FIG. 18. In the message 1801, the user designates the key word as "@Print_Bot, please print. Target key word [Schedule]". If no key word is designated in the instructed message (YES in step S1106), the processing proceeds to step 1107. In step S1107, the bot service 321 empties the key word list. Subsequently, in step S1109, the bot service 321 determines whether the key word list is empty. If determining that the key word list is empty (YES in step S1109), the processing proceeds to step S1110. In step S1110, the bot service 321 makes a request for acquiring the message history information corresponding to all the messages to the message application server 101. If determining that the key word list is not empty (NO in step S1109), the processing proceeds to step S1111. In step S1111, the bot service 321 makes a request for acquiring the message history information corresponding to the message including the key word in the key word list to the message application server 101. In step S1112, the bot service 321 executes the processing of extracting the file information from the acquired message history information. Since a specific example of the processing of extracting the file information is the same as that illustrated in FIG. 8B, a description thereof will be omitted.

According to the present exemplary embodiment, the bot service 321 detects the print target file with reference only to the message including the designated key word, as described above.

If the bot service 321 refers to all the messages, the number of messages may become enormous. In this respect, the bot service 321 can avoid the issue and present the file candidates for the print target promptly to the user.

In the second exemplary embodiment, the description has been given of the method of confirming every detected print target file with the user.

In a sixth exemplary embodiment, a description will be given of a method of changing a presentation method to the user in a case where the number of detected print target files is a predetermined number or greater.

Specific processing according to the present exemplary embodiment will be described with reference to FIGS. 12 and 19.

Only a difference from the first to third exemplary embodiments will be described here. Since a system configuration, a hardware/software configuration, and each processing flow are the same as those of the first exemplary embodiment with some exceptions, a description thereof will be omitted.

Figure 12:
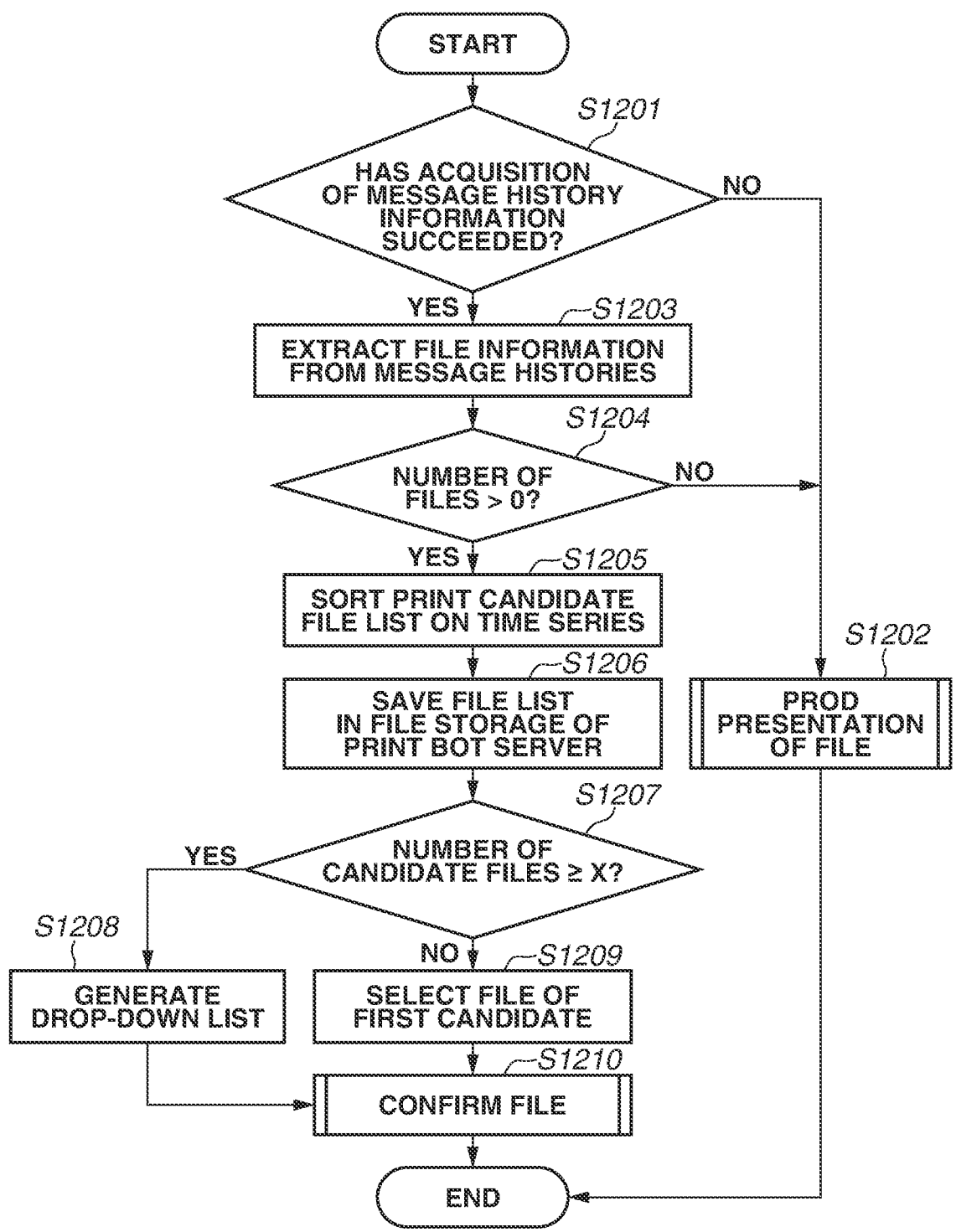
FIG. 12 is a flowchart illustrating an example of processing of a bot service according to a sixth exemplary embodiment.

FIG. 12 illustrates an example in which the bot service 321 detects a file with reference to the message history in the retrospective predetermined period of time designated by the user, and thereafter changes the presentation method to the user in a case where the number of detected print target files is the predetermined number or greater.

Processing in step S1201 is started as a result of the request being made by the bot service 321 to the message application server 101 for acquiring messages in the designated period of time.

Since processing in step S1201 to S1206 is the same as the processing in steps S811 to S816 illustrated in FIG. 8B, a description thereof will be omitted.

In step S1207, after storing the file list in the file storage 322 of the print bot server 102 in step S1206, the bot service 321 determines whether the number of candidate files is a predetermined threshold X or greater. If the number of candidate files is less than the predetermined threshold X (NO in step S1207), the processing proceeds to step S1209 and S1210. In this case, the processing is the same as the processing in steps S817 and S818 in FIG. 8B, and thus a description thereof will be omitted. If the number of candidate files is the predetermined threshold X or greater (YES in step S1207), the processing proceeds to step S1208. In step S1208, the bot service 321 generates a UI control component of a drop-down list, as illustrated as a drop-down list 1901 in FIG. 19. In step S1210, the bot service 321 confirms the file with the user. Since details of the file confirmation processing are the same as those in step S818 illustrated in FIG. 8B, a description thereof will be omitted.

If the number of candidate files is less than the predetermined threshold X (NO in step S1207), the processing proceeds to step S1209 and S1210. In this case, the processing is the same as the processing in steps S817 and S818, and thus a description thereof will be omitted.

According to the present exemplary embodiment, the bot service 321 changes the presentation method to the user in the case where the number of detected print target files is the predetermined number or greater.

With this configuration, in a case where the number of detected candidates is large, the bot service 321 can avoid presentation of an unnecessary message from the print bot, and present the file candidates for the print target promptly to the user.

In the sixth exemplary embodiment, the description has been given of the method of changing the presentation method to the user in the case where the number of detected print target files is the predetermined number or greater.

In a seventh exemplary embodiment, a description will be given of a method of lowering a presentation rank in a case where there is a printed file in detected print target files.

Specific processing according to the present exemplary embodiment will be described with reference to FIGS. 13 and 20.

Only a difference from the first, second, and sixth exemplary embodiments will be described here. Since a system configuration, a hardware/software configuration, and each processing flow are the same as those of the first exemplary embodiment with some exceptions, a description thereof will be omitted.

Figure 13:
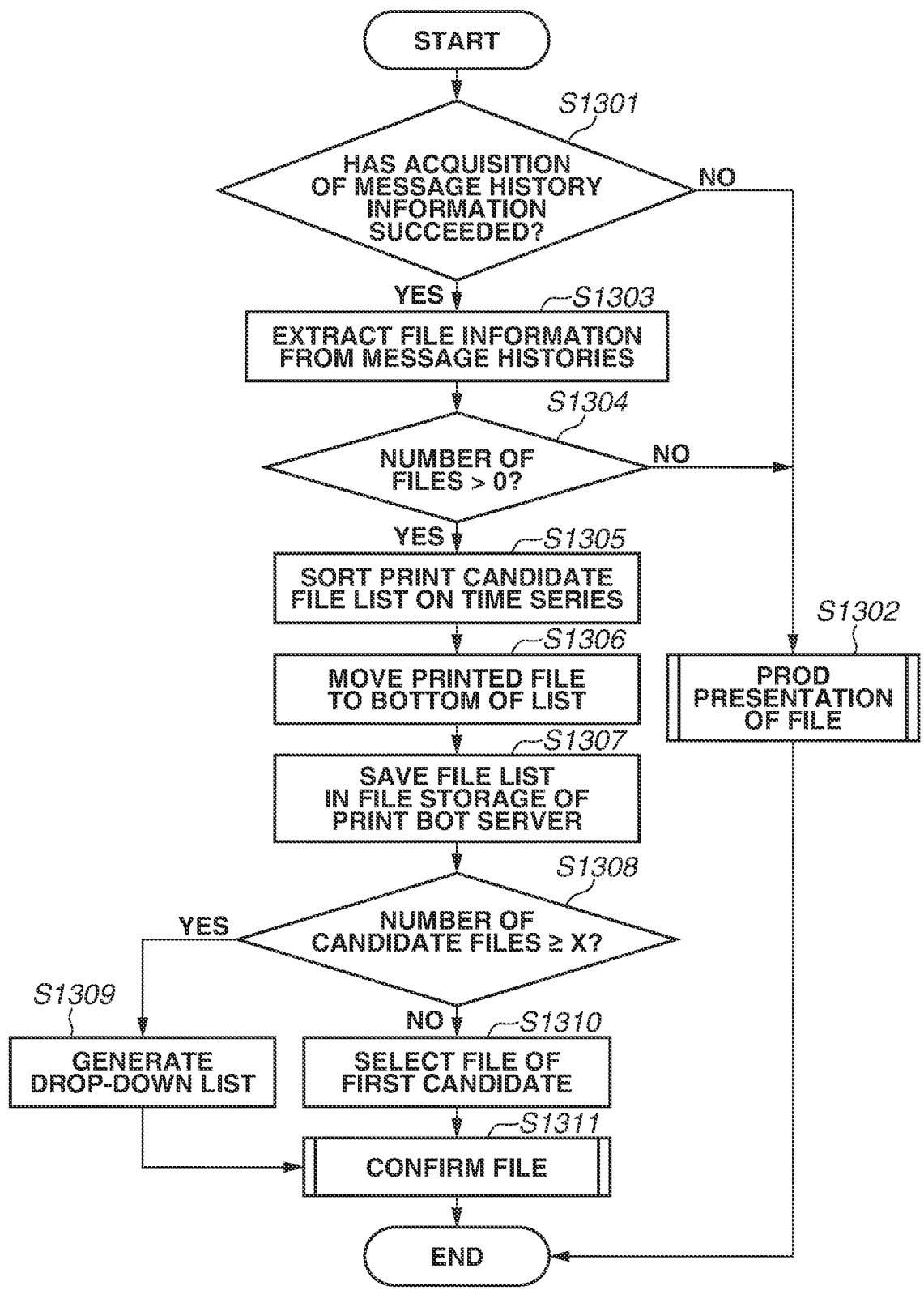
FIG. 13 is a flowchart illustrating an example of processing of a bot service according to a seventh exemplary embodiment.

FIG. 13 illustrates an example in which the bot service 321, after detecting the file, changes the presentation rank in a case where there is the printed file.

Processing in step S321 of the flow in FIG. 13 is started as a result of the request being made by the bot service 321 to the message application server 101 for acquiring messages within the predetermined period of time.

Since processing in steps S1301 to S1305 is the same as the processing in steps S811 to S815 illustrated in FIG. 8B, a description thereof will be omitted.

Figure 20:
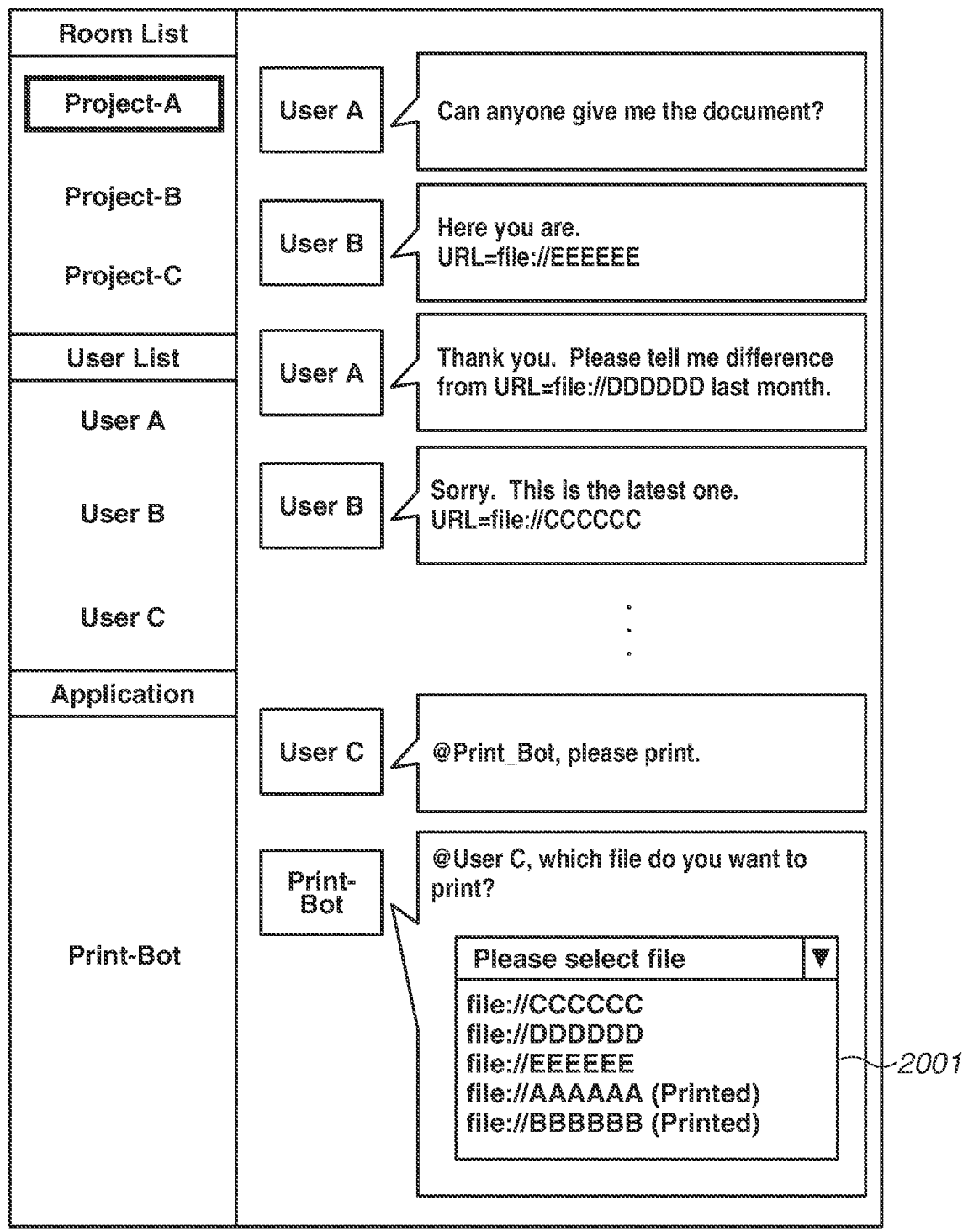
FIG. 20 is a diagram illustrating an example of conversation with the bot service according to the seventh exemplary embodiment.

In step S1306, after sorting the contents of the print candidate file list in time series in step S1305, the bot service 321 moves the printed file, which has been printed by the user in the past, to the bottom of the print candidate file list, and lowers a rank of presentation to the user as illustrated in a drop-down list 2001 in FIG. 20. Examples of a method of determining a file as the printed file include a method by which the bot service 321 holds a file name list in the file storage of the bot and a method by which the bot service 321 makes an inquiry to the print server. Subsequently, in step S1307, the bot service 321 stores the file list in the file storage 322 of the print bot server 102. Since processing in steps S1308 to S1311 is the same as the processing in steps S1207 to S1210 illustrated in FIG. 12, a description thereof will be omitted.

According to the present exemplary embodiment, the bot service 321 lowers the rank of presentation as the print candidate file to the user in the case where the file is the printed file.

With this configuration, the bot service 321 can avoid waste of performing redundant print, and increase the user's convenience.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-228216, filed Dec. 18, 2019, which is hereby incorporated by reference herein in its entirety.

What is claimed is:

1. A server system that provides a conversation service, comprising:
a memory; and
a processor that causes, by executing instructions stored in the memory, the server system to function as:
a determination unit configured to determine that a print instruction of a file has been given from a user in the conversation service, the file to be printed by the print instruction being not specified by the user;
an acquiring unit configured to acquire a predetermined number of messages in the conversation service including the user, wherein the predetermined number of messages are messages prior to the print instruction; and
a specifying unit configured to specify the file having been uploaded to the conversation service most recently and prior to the given print instruction;
a posting unit configured to post, on a basis of the determination unit determining that the print instruction has been given, a name of the file as a print target candidate on the conversation service, the file specified by the specifying unit,
wherein the name of the file is determined from the predetermined number of messages.

2. The server system according to claim 1,
wherein the posting unit is configured to post on the conversation service respective names of a plurality of files having been uploaded to the conversation service out of the predetermined number of messages, including the file specified by the specifying unit, in a retrospective period of time from timing at which the determination unit determines that the print instruction has been given.

3. The server system according to claim 2,
wherein the posting unit is configured to, in posting the respective names of the plurality of files on the conversation service, perform control to lower an order of a file that has been printed in the past via the conversation service.

4. The server system according to claim 1,
wherein the print instruction includes information indicating a print instruction for a file which a user has uploaded, and
wherein the posting unit is configured to post on the conversation service as the print target candidate the name of the file specified by the specifying unit out of a plurality of files having been uploaded by the user indicated by the information.

5. A control method of a server system that provides a conversation service, the method comprising:
- determining that a print instruction of a file has been given from a user in the conversation service, the file to be printed by the print instruction being not specified by the user;
- acquiring a predetermined number of messages in the conversation service including the user, wherein the predetermined number of messages are messages prior to the print instruction; and
- specifying the file having been uploaded to the conversation service most recently and prior to the given print instruction;
- on a basis of the determination that the print instruction has been given, posting a name of the file as a print target candidate on the conversation service, the specified file,
- wherein the name of the file is determined from the predetermined number of messages.

6. The control method of the server system according to claim 5,
- wherein the posting includes posting on the conversation service respective names of a plurality of files having been uploaded to the conversation service out of the predetermined number of messages, including the specified file, in a retrospective period of time from timing at which the determination that the print instruction has been given is made.

7. The control method of the server system according to claim 6,
- wherein the posting of the respective names of the plurality of files on the conversation service includes performing control to lower an order of a file that has been printed in the past via the conversation service.

8. The control method of the server system according to claim 5,
- wherein the print instruction includes information indicating a print instruction for a file which a user has uploaded, and
- wherein the posting includes posting on the conversation service as the print target candidate the name of the specified file out of a plurality of files having been uploaded by the user indicated by the information.

9. A non-transitory computer readable storage medium for storing a computer program for controlling a server system that provides a conversation service, the computer program comprising:
- a code to determine that a print instruction of a file has been given from a user in the conversation service, the file to be printed by the print instruction being not specified by the user;
- a code to acquire, a predetermined number of messages in the conversation service including the user, wherein the predetermined number of messages are messages prior to the print instruction; and
- a code to specify, the file having been uploaded to the conversation service most recently and prior to the given print instruction;
- a code to post, on a basis of the determination that the print instruction has been given, a name of the file as a print target candidate on the conversation service, the specified file,
- wherein the name of the file is determined from the predetermined number of messages.

10. The non-transitory computer readable storage medium according to claim 9,
- wherein respective names of a plurality of files having been uploaded to the conversation service are posted on the conversation service out of the predetermined number of messages, including the specified file, in a retrospective period of time from timing at which determination that the print instruction has been given is made.

11. The non-transitory computer readable storage medium according to claim 10,
- wherein posting of the respective names of the plurality of files on the conversation service includes performing control to lower an order of a file that has been printed in the past via the conversation service.

12. The non-transitory computer readable storage medium according to claim 9,
- wherein the print instruction includes information indicating a print instruction for a file which a user has uploaded, and
- wherein the posting includes posting on the conversation service as the print target candidate the name of the specified file out of a plurality of files having been uploaded by the user indicated by the information.

13. The non-transitory computer readable storage medium according to claim 9,
- wherein the posted file is uploaded to the conversation service most recently before it is determined that the print instruction has been given from a plurality of files having been uploaded to the conversation service.

14. The non-transitory computer readable storage medium according to claim 9, wherein the name of the file is posted as the print target candidate even if another information is posted between the print instruction and the file having been uploaded to the conversation service.

* * * * *